United States Patent
Ogura et al.

(10) Patent No.: US 10,829,115 B2
(45) Date of Patent: Nov. 10, 2020

(54) WORK VEHICLE

(71) Applicant: Yanmar Co., Ltd., Osaka-shi, Osaka-fu (JP)

(72) Inventors: Kouhei Ogura, Osaka (JP); Toshiyuki Miwa, Osaka (JP); Kenta Ikenori, Osaka (JP)

(73) Assignee: YANMAR POWER TECHNOLOGY CO., LTD., Osaka (JP)

(*) Notice: Subject to any disclaimer, the term of this patent is extended or adjusted under 35 U.S.C. 154(b) by 0 days.

(21) Appl. No.: 15/776,256

(22) PCT Filed: Nov. 1, 2016

(86) PCT No.: PCT/JP2016/082427
§ 371 (c)(1),
(2) Date: May 15, 2018

(87) PCT Pub. No.: WO2017/086147
PCT Pub. Date: May 26, 2017

(65) Prior Publication Data
US 2019/0161081 A1 May 30, 2019

(30) Foreign Application Priority Data
Nov. 17, 2015 (JP) .................... 2015-224785

(51) Int. Cl.
*B60W 30/14* (2006.01)
*F16H 63/50* (2006.01)
(Continued)

(52) U.S. Cl.
CPC .......... *B60W 30/143* (2013.01); *B60W 10/06* (2013.01); *B60W 10/103* (2013.01);
(Continued)

(58) Field of Classification Search
CPC .... B60W 30/143; B60W 30/14; B60W 10/06; B60W 10/103; B60W 30/1884;
(Continued)

(56) References Cited

U.S. PATENT DOCUMENTS 8,676,467 B2 * 3/2014 Fujimoto .......... B60W 30/1888
701/93
9,308,819 B2 * 4/2016 Fujimoto .......... B60W 30/1888
(Continued)

FOREIGN PATENT DOCUMENTS

JP     08-300979 A    11/1996
JP     2003-072430 A   3/2003
(Continued)

OTHER PUBLICATIONS

Extended European search report dated Oct. 15, 2018 issued in corresponding EP Application No. 16866149.4 cites the patent documents above.
(Continued)

*Primary Examiner* — Russell Frejd
(74) *Attorney, Agent, or Firm* — Norton Rose Fulbright US LLP

(57) ABSTRACT

A work vehicle includes an engine mounted on a traveling body including traveling wheels; a hydraulic stepless transmission that shifts a speed of the driving force from the engine; a gear shift pedal that performs an acceleration/deceleration operation of a shifted output from the hydraulic stepless transmission; and a control section that controls the engine and the hydraulic stepless transmission based on the operation amount of the gear shift pedal. When an operation on a set switch is received in a state where the gear shift pedal is pressed by a foot operation in an auto-cruise standby mode, the control section stores the vehicle speed and the number of engine revolutions in accordance with the foot
(Continued)

operation position of the gear shift pedal and shifts to an auto-cruise mode.

20 Claims, 23 Drawing Sheets

(51) Int. Cl.
| | |
|---|---|
| *F02D 29/02* | (2006.01) |
| *F16H 61/02* | (2006.01) |
| *F02D 29/00* | (2006.01) |
| *B60W 10/06* | (2006.01) |
| *B60W 10/103* | (2012.01) |
| *B60W 30/188* | (2012.01) |

(52) U.S. Cl.
CPC ........ *B60W 30/14* (2013.01); *B60W 30/1884* (2013.01); *F02D 29/00* (2013.01); *F02D 29/02* (2013.01); *F16H 61/02* (2013.01); *F16H 63/50* (2013.01); *B60W 2510/0638* (2013.01); *B60W 2520/10* (2013.01); *B60W 2540/16* (2013.01); *B60W 2710/1005* (2013.01)

(58) Field of Classification Search
CPC ..... B60W 2510/0638; B60W 2520/10; B60W 2540/16; B60W 2710/1005; F16H 63/50; F16H 61/023; F02D 29/02; F02D 29/00; F02D 2200/501; F02D 2200/101; F02D 41/023; F02D 41/0225; F02D 41/021
See application file for complete search history.

(56) References Cited

U.S. PATENT DOCUMENTS

| | | | |
|---|---|---|---|
| 2010/0174456 A1* | 7/2010 | Beaudoin | B60W 10/06 |
| | | | 701/51 |
| 2011/0297462 A1 | 12/2011 | Grajkowski et al. | |
| 2018/0172147 A1* | 6/2018 | Scott | F16H 61/66 |
| 2018/0319398 A1* | 11/2018 | Ogura | B60W 10/06 |

FOREIGN PATENT DOCUMENTS

| | | |
|---|---|---|
| JP | 2003-200752 A | 7/2003 |
| JP | 2009-040409 A | 2/2009 |
| JP | 2012-067829 A | 4/2012 |
| JP | 2012-187030 A | 10/2012 |
| JP | 2013-112104 A | 6/2013 |
| JP | 2013-170609 A | 9/2013 |
| WO | 92/06860 A1 | 4/1992 |

OTHER PUBLICATIONS

International Search Report dated Jan. 31, 2017 issued in corresponding PCT Application PCT/JP2016/082427 cites the patent documents above.

* cited by examiner

WORK VEHICLE

CROSS REFERENCES TO RELATED APPLICATIONS

This application is a national stage application pursuant to 35 U.S.C. § 371 of International Application No. PCT/JP2016/082427, filed on Nov. 1, 2016, which claims priority under 35 U.S.C. § 119 to Japanese Patent Application No. 2015-224785, filed on Nov. 17, 2015, the disclosures of which are hereby incorporated by reference in their entireties.

TECHNICAL FIELD

The present invention relates to a work vehicle exemplified by an agricultural tractor for towing a ground work machine, such as a tilling work machine or a seeding work machine, or a wheel loader for construction work.

BACKGROUND ART

A work vehicle such as a tractor or a wheel loader shifts the speed of a hydraulic stepless transmission by pressing an accelerator pedal (gear-shift member) to drive a traveling unit and a work unit. Some of such work vehicles provide auto-cruise control for keeping a gear-shift position in the hydraulic stepless transmission. This vehicle is configured to use cruise control to keep a constant velocity vehicle speed without continuously pressing the accelerator pedal (see Patent Literature: PTL 1).

In a work vehicle such as a tractor or a wheel loader, a steering wheel for steering a traveling body, a plurality of lever members for setting and adjusting a traveling state of the traveling body, and so forth are arranged around a cockpit seat in consideration of operability. An agricultural tractor, for example, includes a plurality of lever members such as a main gear shift lever, a sub-gear shift lever, a forward/reverse switching lever, and a PTO gear shift lever (see Patent Literature 2: PTL 2).

The main gear shift lever is used for changing the vehicle speed of the traveling body. The sub-gear shift lever is used for holding settings of a gear shift output of a transmission within a predetermined range. The forward/reverse switching lever is used for switching the traveling direction of the traveling body between forward and reverse. The PTO gear shift lever is used for shifting the speed of an output (PTO driving force) to the work machine. In the case of attaching a loader to a front end of the tractor, a lever (joystick lever) for operating the loader is provided (see Patent Literature 3: PTL 3).

CITATION LIST

Patent Literatures

PTL 1: Japanese Patent Application Laid-Open No. 2012-067829
PTL 2: Japanese Patent Application Laid-Open No. 2013-112104
PTL 3: Japanese Patent Application Laid-Open No. 2013-170609

SUMMARY OF INVENTION

Technical Problem

In the work vehicle of PTL 1, in performing auto-cruise control, the speed to be maintained is set at the maximum vehicle speed in a case where the pressing amount of pressing a forward/reverse traveling pedal is at the maximum so that the speed travels at a constant speed. Thus, the vehicle speed in the auto-cruise control cannot be set at an intended speed, and in some conditions of a field, a workshop, or a road, the auto-cruise control cannot be performed. After auto-cruise control is performed at the start of work, the vehicle speed cannot be adjusted to an optimum speed with checking of a work state.

A tractor equipped with a work unit such as a loader has a purpose of increasing working efficiency by operating the traveling unit while operating the work unit. In a conventional tractor, however, an operation tool for the work unit is retrofitted to the tractor together with a work unit, and thus, an operation intended by an operator cannot be achieved, and an increase in working efficiency is inhibited.

An aspect of the present invention has a technical object of providing a tractor improved in view of circumstances described above.

Solution to Problem

A work vehicle according to an aspect of the present invention is a work vehicle including an engine mounted on a traveling body including a traveling wheel, a hydraulic stepless transmission mechanism that shifts a speed of a driving force from the engine, a gear shift pedal that performs an acceleration/deceleration operation of a shifted output from the hydraulic stepless transmission mechanism, and a control section that controls the engine and the hydraulic stepless transmission mechanism based on an operation amount of the gear shift pedal, the work vehicle being capable of performing an auto-cruise mode of keeping a vehicle speed substantially constant, and the work vehicle includes: a cruise switch for setting whether to shift to the auto-cruise mode or not; and a set switch for shifting to the auto-cruise mode, wherein the control section shifts to an auto-cruise standby mode in which a shift to the auto-cruise mode is permitted when an on-operation on the cruise switch is received in a normal operation mode, and stores a vehicle speed and the number of revolutions of the engine in accordance with a foot operation position of the gear shift pedal and shifts to the auto-cruise mode when an operation on the set switch is received in a state where the gear shift pedal is pressed by the foot operation in the auto-cruise standby mode.

Such a work vehicle may include an acceleration/deceleration switch that increases and reduces a vehicle speed in performing the auto-cruise mode, and when the control section receives an operation on the acceleration/deceleration switch in the auto-cruise mode, the control section may increase and reduce the vehicle speed stored in shifting to the auto-cruise mode and then keep the vehicle speed substantially constant.

In such a work vehicle, when a continuous operation time to the acceleration/deceleration switch reaches a predetermined time or more, the vehicle speed may be continuously increased and reduced.

In such a work vehicle, the control section may store a maximum number of revolutions of the engine set for each of the plurality of traveling modes, and in a case where the acceleration/deceleration switch is operated in the auto-cruise mode during execution of the accelerator cooperation control, the control section may increase and reduce the number of revolutions of the engine stored in shifting to the auto-cruise mode depending on an amount of change in accordance with the maximum number of revolutions of the engine in the traveling mode specified with the mode shift switch.

In such a work vehicle, when the control section receives an operation on the accelerator cooperation switch in the auto-cruise mode, the control section may erase the stored vehicle speed and the stored number of revolutions of the engine, and shift to the auto-cruise standby mode.

Such a work vehicle may include: an engine stall preventing switch for performing engine stall preventing control of reducing the vehicle speed in accordance with a load to prevent a stall of the engine, and in a case where the engine stall preventing control is performed in the auto-cruise mode, when a load increases so that the vehicle speed is reduced and then the load decreases, the control section may keep the vehicle speed at an original speed, whereas in a case where the vehicle speed is reduced based on the engine stall preventing control in the auto-cruise standby mode, the control section may invalidate an operation on the set switch.

The work vehicle may include: an acceleration/deceleration switch that increases and reduces a vehicle speed in performing the auto-cruise mode; and a mode shift switch that performs switching among a plurality of traveling modes, the control section may store a maximum vehicle speed set for each of the plurality of traveling modes, and in a case where the acceleration/deceleration switch is operated in the auto-cruise mode, the control section may increase and reduce the vehicle speed stored in shifting to the auto-cruise mode depending on an amount of change in accordance with the maximum vehicle speed in the traveling mode specified with the mode shift switch.

In such a work vehicle, the control section may set an upper limit of the vehicle speed in a case where the vehicle speed is increased with the acceleration/deceleration switch in the auto-cruise mode, as the maximum vehicle speed in the traveling mode specified with the mode shift switch.

Such a work vehicle may include an accelerator cooperation switch for performing accelerator cooperation control of changing the vehicle speed and the number of revolutions of the engine depending on the amount of pressing of the gear shift pedal. In a case of a shift to the auto-cruise mode in performing the accelerator cooperation control, when the control section receives an operation on the acceleration/deceleration switch, the control section may increase and reduce the vehicle speed and the number of revolutions of the engine stored in shifting to the auto-cruise mode.

In such a work vehicle, the control section may store a maximum number of revolutions of the engine set for each of the plurality of traveling modes, and in a case where the acceleration/deceleration switch is operated in the auto-cruise mode during execution of the accelerator cooperation control, the control section may increase and reduce the number of revolutions of the engine stored in shifting to the auto-cruise mode depending on an amount of change in accordance with the maximum number of revolutions of the engine in the traveling mode specified with the mode shift switch.

In such a work vehicle, when the control section receives an operation on the accelerator cooperation switch in the auto-cruise mode, the control section may cancel the auto-cruise mode. When the control section receives an operation on the mode shift switch in the auto-cruise mode, the control section may cancel the auto-cruise mode.

In such a work vehicle, in a case where the acceleration/deceleration switch is operated in the auto-cruise mode, the control section may increase and reduce the vehicle speed stored in shifting to the auto-cruise mode depending on an amount of change in accordance with an actual vehicle speed in shifting to the auto-cruise mode. In a case where the acceleration/deceleration switch is operated in the auto-cruise mode, the control section may increase and reduce the vehicle speed stored in shifting to the auto-cruise mode depending on an amount of change in accordance with an actual vehicle speed in shifting to the auto-cruise mode.

The work vehicle may be a work vehicle configured to shift a speed of a driving force from an engine mounted on a traveling body in a transmission unit and to transfer the shifted driving force to a traveling unit and a work unit, and includes: a mode shift switch that switches a maximum vehicle speed by the traveling unit or a maximum number of revolutions of the engine, the maximum vehicle speed and the maximum number of revolutions being set for each of a plurality of modes; and a work unit operation lever configured to be used for operating the work unit, and the work unit operation lever is provided with a mode shift switch.

Accordingly, with the configuration in which the work unit operation lever is provided with the mode shift switch, the maximum vehicle speed by the traveling unit and the maximum number of revolutions of the engine can be switched with the work unit operation lever according to an operating state of the work unit. Thus, the work unit and the traveling unit can be operated at the same time with a single operation tool. Accordingly, operability can be enhanced. In addition, the maximum vehicle speed by the traveling unit or the maximum number of revolutions of the engine is switched in accordance with a load on the work unit so that not only errors in work can be reduced but also the traveling time in a non-work state can be reduced, and fuel efficiency in the non-work state can be enhanced.

In such a work vehicle, in a cockpit unit on the traveling body, the work unit operation lever may be disposed ahead of and outside a cockpit seat, the work unit operation lever may include a grip disposed near the cockpit seat, and the grip may be provided with the mode shift switch. The mode shift switch may be disposed on a side surface of the grip facing the cockpit seat.

Accordingly, the grip of the work unit operation lever is provided with the mode shift switch so that the mode shift switch can be operated at a position at which an operator can easily hold the grip, and thus, operability can be further enhanced. In addition, since the mode shift switch is disposed on the side surface of the grip facing the cockpit seat, the operator can easily operate the mode shift switch with the thumb of a hand holding the grip, and thus, complexity in operation can be reduced.

In the work vehicle, the work unit operation lever may be provided with an engine blipping switch used for performing an engine blipping operation of increasing the number of revolutions of the engine while maintaining a vehicle speed of the traveling unit constant. In addition, an operation to the mode shift switch may be invalid while the engine blipping control is being performed.

Accordingly, the work unit operation lever is provided with the engine blipping switch for performing engine blipping control. Thus, the operator can change the number of revolutions of the engine in accordance with a load on the work unit and can keep the vehicle speed by the traveling unit constant. Accordingly, a change in the vehicle speed by the traveling unit can be reduced in accordance with a load on the work unit, and thus, a decrease in working efficiency in using the work unit can be reduced. In addition, an operation of the mode shift switch is invalid while the engine blipping control is being performed. This makes it possible to prevent the maximum vehicle speed or the maximum number of revolutions of the engine after switching from becoming an abnormal value because of an increase in the number of revolutions of the engine in the engine blipping control. As a result, occurrence of a sudden accident or the like can be avoided.

The work vehicle may include: a gear shift pedal configured to adjust a vehicle speed by the traveling unit and the number of revolutions of the engine; and a forward/reverse switching lever configured to specify forward traveling and reverse traveling by the traveling unit, the transmission unit may include a hydraulic stepless transmission mechanism that shifts a speed of a driving force from the engine and a forward/reverse switching mechanism that switches the shifted driving force from the hydraulic stepless transmission mechanism from forward to reverse or from reverse to forward, and a transmission ratio by the hydraulic stepless transmission mechanism may be changed with the gear shift pedal, and switching by the forward/reverse switching mechanism is performed with the forward/reverse switching lever.

Advantageous Effects of Invention

According to an aspect of the present, the vehicle speed and the number of revolutions of the engine are stored based on the foot operation position of the gear shift pedal and the mode can be shifted to the auto-cruise mode. Thus, the vehicle speed kept constant in the auto-cruise mode can be set at an optimum vehicle speed in accordance with a work state. In addition, the mode can be shifted to the auto-cruise mode during an operation of the gear shift pedal, and thus, an operator can easily determine an optimum vehicle speed while checking a road state. Thus, in shifting to the auto-cruise mode, a complicated operation is not necessary for setting the vehicle speed, and operability can be enhanced.

An aspect of the present invention can provide a configuration in which the acceleration/deceleration switches can adjust the vehicle speed in the auto-cruise mode to enable easy change of the vehicle speed during traveling in the auto-cruise mode. Accordingly, it is unnecessary to set the vehicle speed again in the auto-cruise mode during work or traveling, and thus, the vehicle speed can be changed to a speed suitable for work or traveling with an easy operation.

An aspect of the present invention can provide a configuration in which the number of revolutions of the engine can be increased and reduced together with the vehicle speed, and thus, when the mode shifts to an auto-cruise mode during execution of accelerator cooperation control, the operator can perform control of the vehicle without incongruity sense. In addition, an aspect of the present invention can also provide a configuration in which engine stall preventing control can be performed in the auto-cruise mode. Thus, in a case where a load is applied to the engine because of work, the vehicle speed can be temporarily reduced to prevent an engine stall, and thus, the work can be continued.

DESCRIPTION OF EMBODIMENTS

Figure 1:
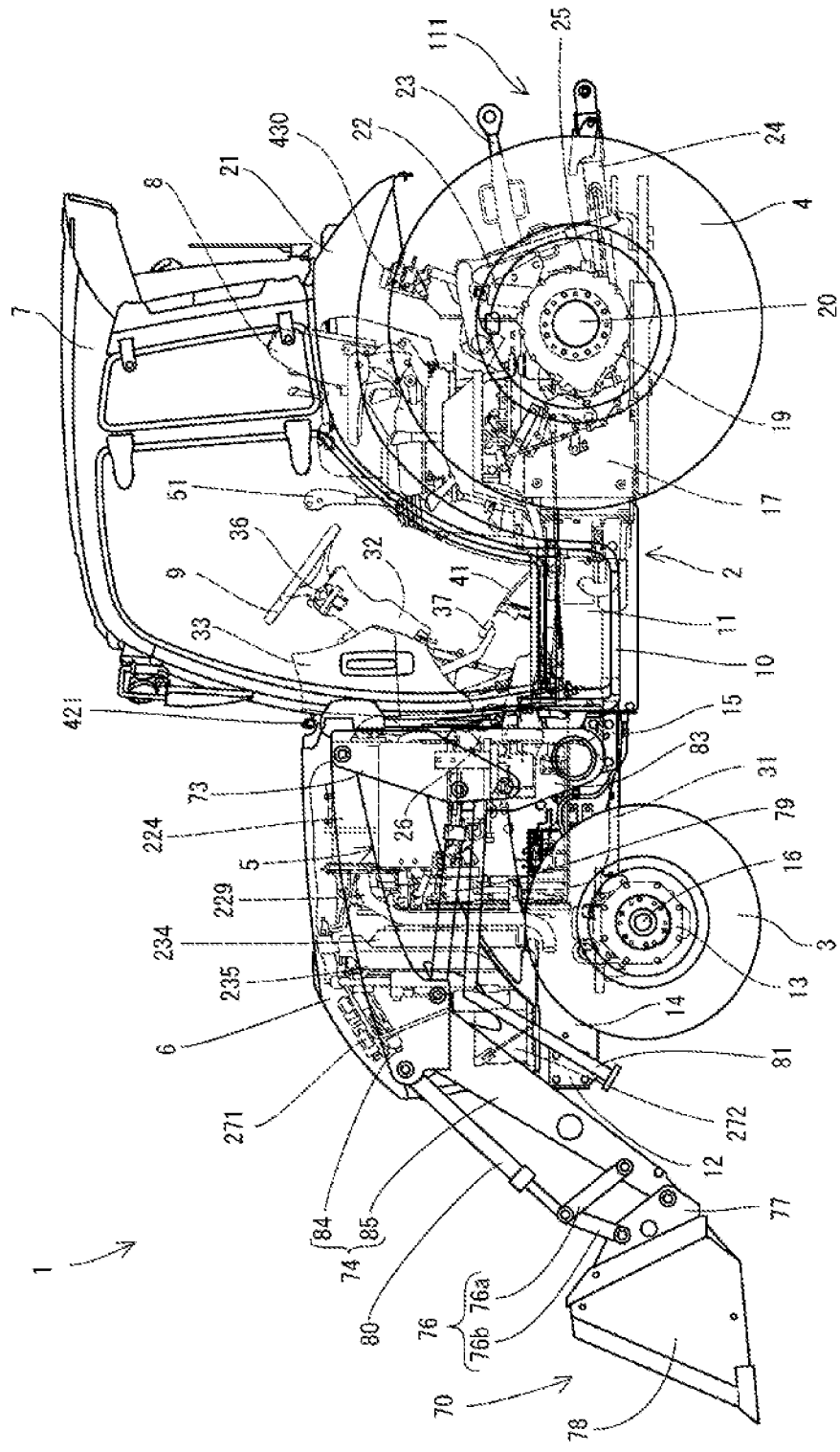
FIG. 1 A left side view of a tractor
FIG. 2 A right side view of the tractor
FIG. 3 A plan view of the tractor
FIG. 4 An illustration of the left side of a traveling body
FIG. 5 An illustration of the right side of the traveling body FIG. 6 A driving force transfer system diagram of the tractor
FIG. 7 An enlarged plan view illustrating a configuration of the inside of a cabin
FIG. 8 A perspective view of the inside of the cabin when seen from right-forward
FIG. 9 A view seen forward from a cockpit seat
FIG. 10 A front view of a meter panel seen from the cockpit seat
FIG. 11 A side view of the inside of the cabin seen from the right side
FIG. 12 A perspective view illustrating a configuration around a loader lever
FIG. 13 A perspective view illustrating a configuration around a loader valve
FIG. 14 A perspective view of an appearance of the loader lever
FIG. 15 A flat cross-sectional view of the loader lever
FIG. 16 A functional block diagram of a control device
FIG. 17 A state transition diagram for describing engine blipping control
FIG. 18 A state transition diagram for describing accelerator cooperation control
FIG. 19 A graph showing a deceleration rate in anti-stall control set with a vehicle speed sensitivity adjusting dial
FIG. 20 A flowchart depicting an operation in auto-cruise control
FIG. 21 A flowchart depicting an operation of acceleration/deceleration control in an auto-cruise mode
FIG. 22 A diagram showing a relationship among the number of operations of an acceleration/deceleration switch, the number of engine revolutions, and the vehicle speed in a case where accelerator cooperation control is not performed
FIG. 23 A graph showing a relationship between the number of operations of the acceleration/deceleration switch, the number of engine revolutions, and the vehicle speed in a case where accelerator cooperation control is performed
Figure 2:
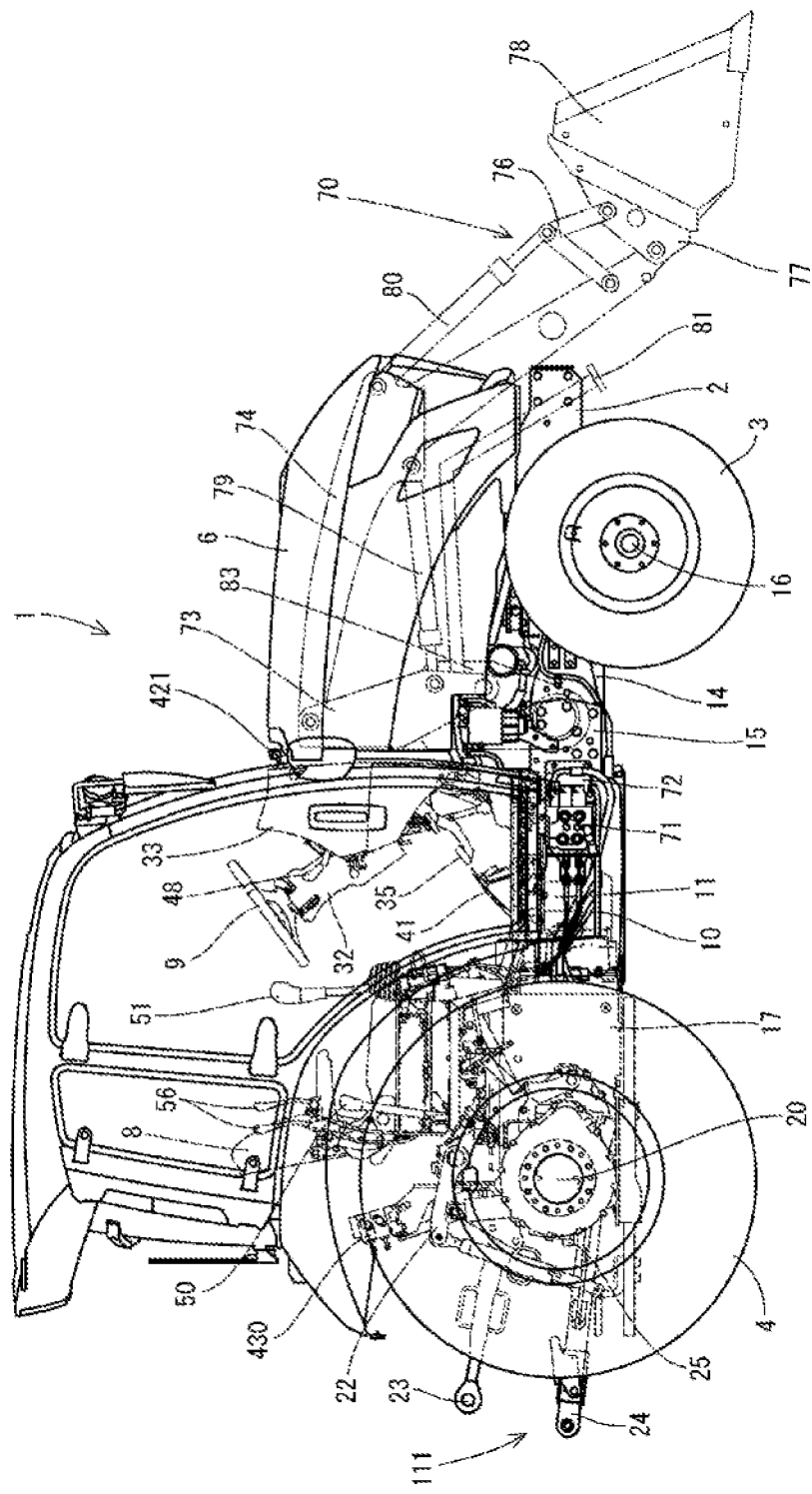
Figure 3:
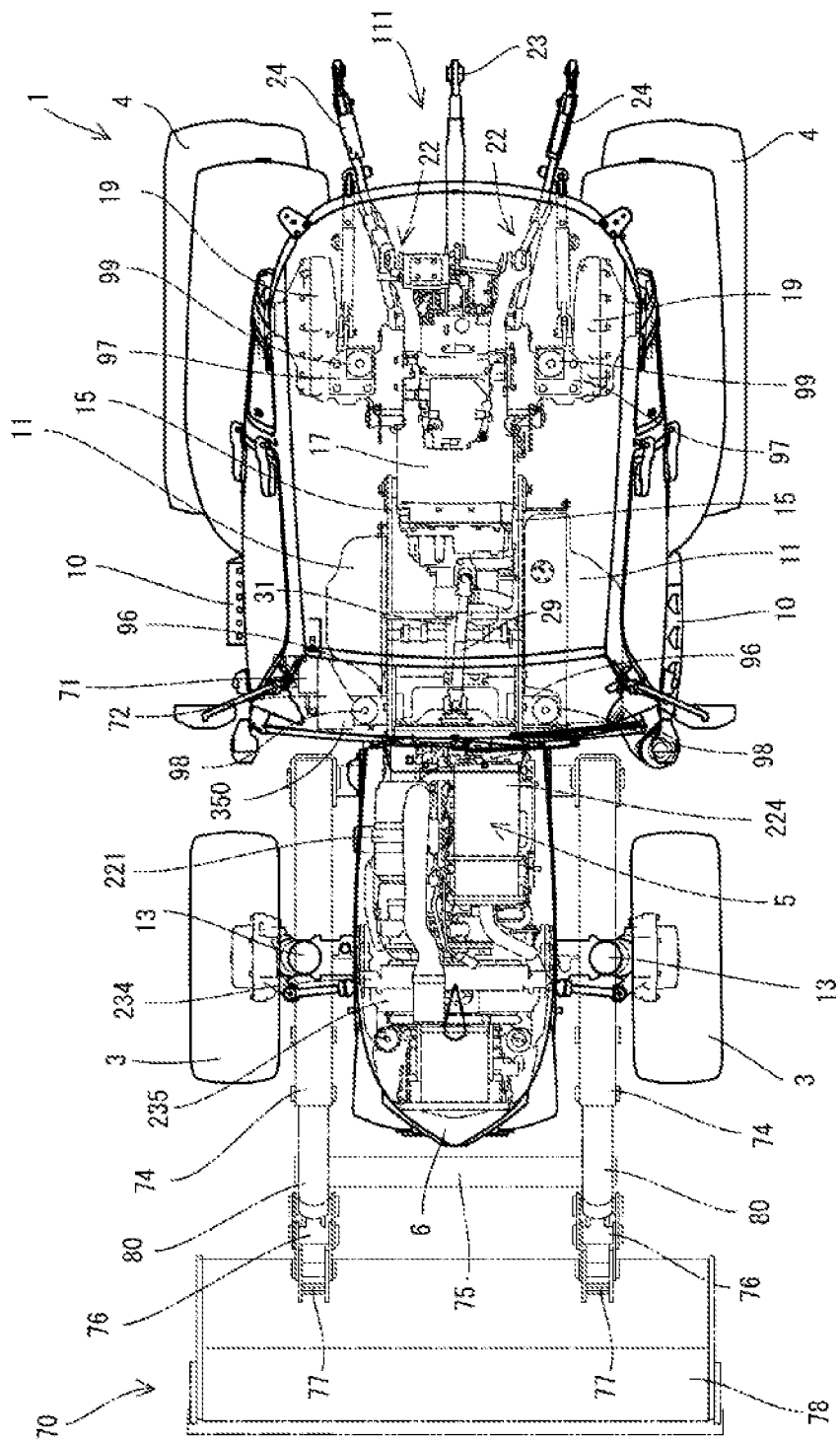
Figure 4:
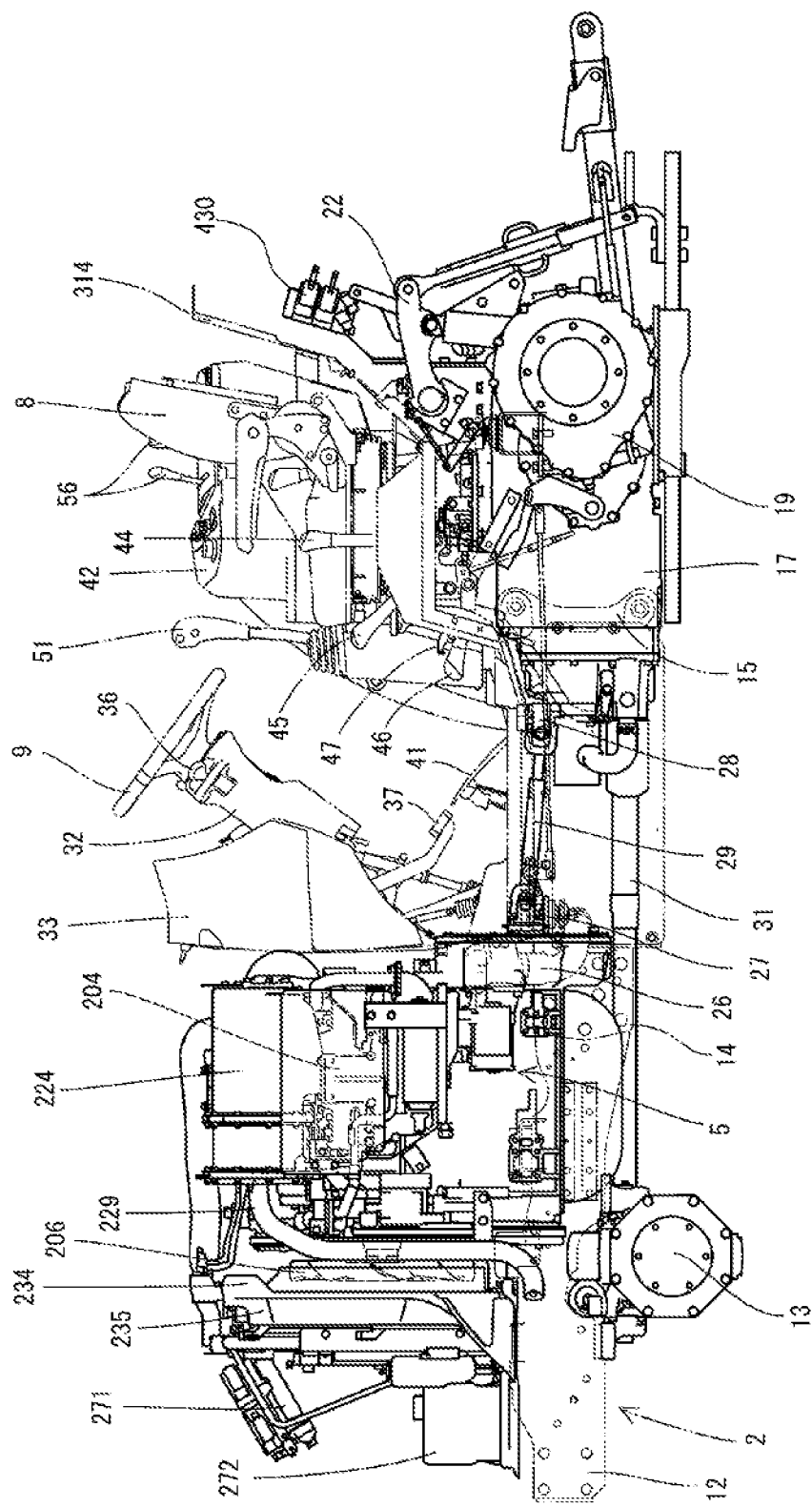
Figure 5:
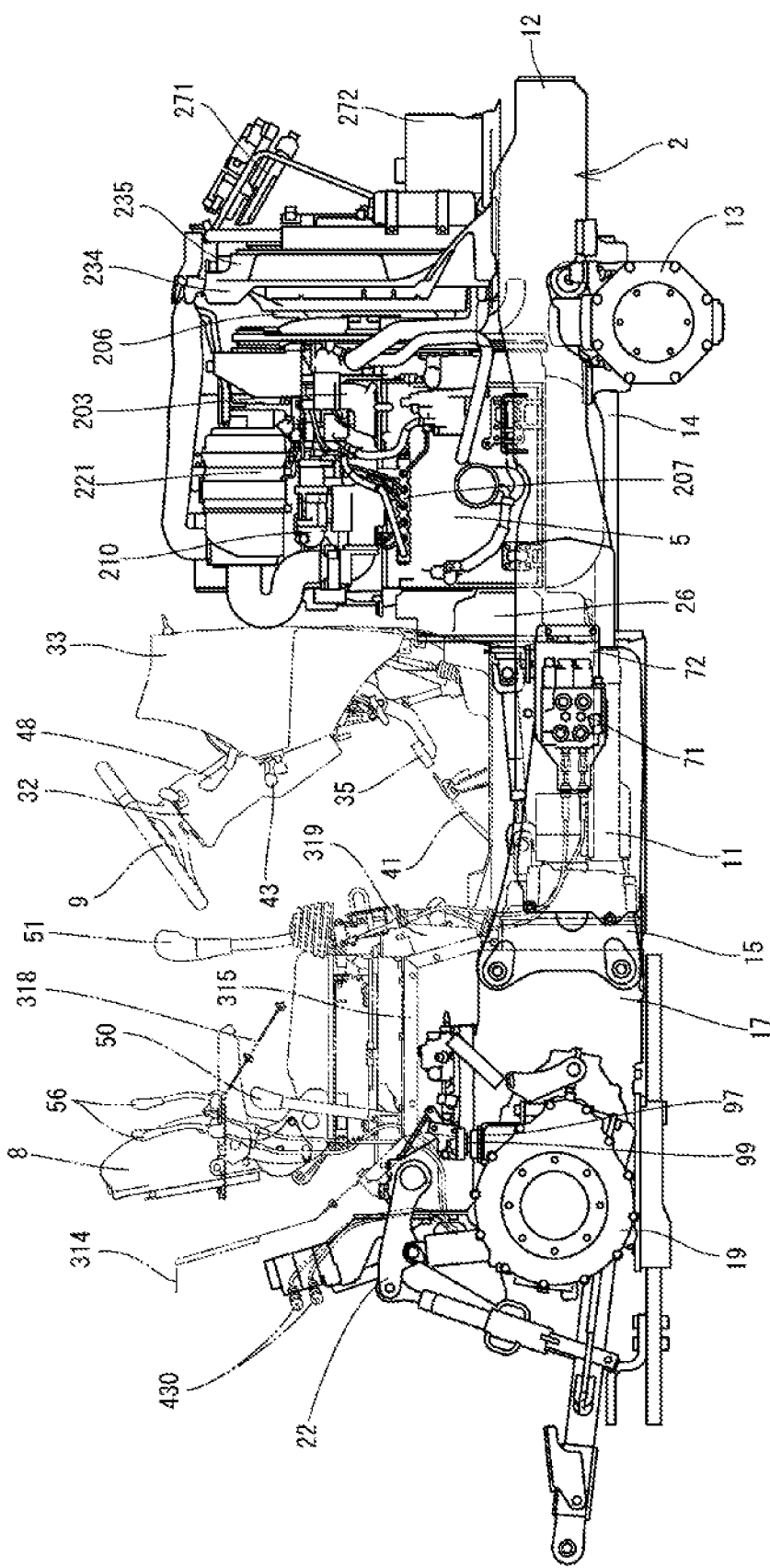

An agricultural tractor according to an embodiment of the present invention will be described hereinafter with reference to the drawings. As illustrated in FIGS. 1 through 5, a traveling body 2 of a tractor 1 is supported by a pair of left and right front wheels 3 and a pair of left and right rear wheels 4 as traveling units. The pair of left and right rear wheels 4 corresponds to a rear traveling unit. A diesel engine 5 (hereinafter simply referred to as an engine) is mounted in a front portion of the traveling body 2, and when the rear wheels 4 or the front wheels 3 are driven by the engine 5, the tractor 1 is thereby caused to travel forward and in reverse. The engine 5 is covered with a hood 6. A cabin 7 is disposed on the upper surface of the traveling body 2. In the cabin 7, a cockpit seat 8 and a steering wheel 9 for steering the front wheels 3 are disposed. Steps 10 with which an operator walks up and down are externally disposed at the left and right sides of the cabin 7. Fuel tanks 11 for supplying fuel to the engine 5 are disposed below the bottom of the cabin 7.

The traveling body 2 is constituted by an engine frame 14 including a front bumper 12 and a front axle case 13 and left and right body frames 15 detachably fixed to the rear of the engine frame 14. A front axle 16 rotatably projects outward from the left and right ends of the front axle case 13. The front wheels 3 are attached to the left and right ends of the front axle case 13 through the front axle 16. The rear of the he body frame 15 is coupled to a transmission case 17 for appropriately shifting the speed of a rotative force from the engine 5 and transferring the rotative force to the four front and rear wheels 3, 3, 4, and 4. Left and right rear axle cases 19 are attached to the left and right outer side surfaces of the transmission case 17 and project outward. Left and right rear axles 20 are rotatably inserted in the left and right rear axle cases 19. The rear wheels 4 are attached to the transmission case 17 through the rear axles 20. The left and right rear wheels 4 have upper sides covered with left and right rear fenders 21.

The fuel tanks 11 are disposed at the left and right of the traveling body 2. Specifically, the left fuel tank 11 is fixed to an outer side (left side) of the left body frame 15 through front and rear brackets (not shown) and is located between the left step 10 and the left body frame 15. The right fuel tank 11 is fixed to an outer side (right side) of the right body frame 15 and is located between the right step 10 and the right body frame 15. A loader valve 71 for controlling supply of hydraulic oil to hydraulic equipment of a front loader 70 is disposed at an outer side (right side) of the right fuel tank 11. The loader valve 71 is fixed to the outer side (right side) of the right body frame 15 through a valve support bracket 72 and is located between the right step 10 and the right fuel tank 11. The valve support bracket 72 is configured to cover the front side of the right fuel tank 11 and part of the right side and the upper side of the right fuel tank 11, and is also coupled to front supporting platforms 96 described later.

The left and right front supporting platforms 96 that support the front side of the cabin 7 and left and right rear supporting platforms 97 that support a rear portion of the cabin 7 are also provided. The front supporting platforms 96 are bolted onto longitudinally intermediate portions of vehicle outer side surfaces of the left and right body frames 15, a front bottom portion of the cabin 7 is supported on the upper surfaces of the front supporting platforms 96 in a vibration proof manner through anti-vibration rubber members 98, the rear supporting platforms 97 are bolted onto left and right laterally intermediate portions of the upper surfaces of the left and right rear axle cases 19 extending horizontally in a lateral direction (left-right direction), and a rear bottom portion of the cabin 7 is supported on the upper surfaces of the rear supporting platforms 97 in a vibration proof manner through anti-vibration rubber members 99.

The diesel engine 5 is configured in such a manner that a cylinder head is mounted on a cylinder block incorporating an engine output shaft and a piston, an intake manifold 203 to be connected to an air cleaner 221 and an EGR device 210 for recirculating a part of exhaust gas from an exhaust manifold 204 are disposed on a right side surface of the diesel engine 5 (cylinder head), and a part of exhaust gas exhausted to the exhaust manifold 204 is refluxed to the intake manifold 203 so that a maximum combustion temperature in a heavy-load operation decreases, and thereby, the exhaust amount of NOx (nitrogen oxide) from the diesel engine 5 decreases. The air cleaner 221 is disposed to the upper surface (above the intake manifold 203) of the diesel engine 5.

On the other hand, the exhaust manifold 204 to be connected to a tail pipe 229 is disposed on the left side surface of the diesel engine 5 (cylinder head). The diesel engine 5 includes a continuously regenerating exhaust gas purifying device 224 (DPF) disposed to the upper surface (above the exhaust manifold 204) of the diesel engine 5. The tail pipe 229 is connected to an exhaust side of the exhaust gas purifying device 224. The exhaust gas purifying device 224 is configured to remove particulate matter (PM) in exhaust gas exhausted from the engine 5 to the outside of the vehicle through the tail pipe 229, and to reduce carbon monoxide (CO) and hydrocarbon (HC) in the exhaust gas.

A radiator 235 having a rear surface to which a fan shroud 234 is attached stands on the engine frame 14 to be positioned at the front surface of the engine 5. The fan shroud 234 surrounds the outer periphery of a cooling fan ahead of the engine 5, and establishes communication between the radiator 235 and the cooling fan 206. The front surface of the radiator 235 is provided with an oil cooler, a fuel cooler, and so forth, as well as an intercooler. In addition, an engine controller (engine ECU) 271 is disposed above and ahead of a heat exchanger such as the radiator 235, and a battery 272 is disposed below and ahead of the heat exchanger. The engine ECU271 receives a sensor signal from each sensor of the engine 5, and controls driving of the engine 5.

A hydraulic lifting and lowering mechanism 22 for lifting and lowering a ground work machine (not shown) such as a rotary tiller is detachably attached to a rear portion of the transmission case 17. The ground work machine is coupled to the rear portion of the transmission case 17 through a three-point link mechanism 111 constituted by a pair of left and right lower links 23 and a top link 24. A PTO shaft 25 for transferring a PTO driving force to the ground work machine such as the rotary tiller projects rearward from the rear side surface of the transmission case 17.

The front loader 70 is detachably attached to a front portion of the traveling body 2. The front loader 70 is constituted by a pair of left and right masts 73 detachably provided to the engine frame 14, a pair of left and right lift arms 74 coupled to the masts 73 to be rotatably in a vertical direction (top-bottom direction), a coupling pipe 75 coupling the pair of left and right lift arms 74, a pair of left and right work unit links 76, a pair of left and right work unit brackets 77, a work unit 78 attached to the pair of left and right lift arms 74, a pair of left and right arm cylinders 79, a pair of left and right work unit cylinders 80, a stand 81, and a front guard 82 for protecting a front portion of the tractor 1. The front loader 70 performs work by lifting and lowering the work unit 78. In this embodiment, a bucket is used as the work unit 78, but another work unit may be attached.

A pair of left and right loader mounts 83 is fixed to the outer sides of the left and right engine frame 14, respectively. The pair of left and right masts 73 is detachably attached to the pair of left and right loader mounts 83. The lift arms 74 is constituted by welding rear lift arms 84 to be attached to the masts 73 and front lift arms 85 to be attached to the work unit 78. The rear lift arms 84 and the front lift arms 85 are fixed at predetermined angle so that the lift arms 74 are constituted in a boomerang shape in a side view of the vehicle body.

Rear ends of the rear lift arms 84 are pivotally supported on the upper ends of the masts 73, and a front portion of the front loader 70 is configured to be rotatable in the vertical direction about a pair of left and right pivot shafts 86. Distal ends (rear ends) of piston rods of the arm cylinders 79 are pivotally supported on the front ends of vertically intermediate portions of the masts 73. Proximal ends (front ends) of the arm cylinders 79 are pivotally supported on arm cylinder bracket portions of the rear lift arms 84 through pivot shafts whose longitudinal direction coincides with the vehicle width direction.

The arm cylinders 79 are attached to lower portions of the front ends of the rear lift arms 84. The pair of left and right arm cylinders 79 serves as actuators for vertical rotation of the front loader 70. Simultaneous extension and contraction of the piston rods of the pair of left and right arm cylinders 79 adjusts the vertical rotation angle of the front loader 70, that is, the angle of the pair of left and right lift arms 74 with respect to the masts 73.

The front lift arms 85 are integrally fixed by coupling longitudinally intermediate portions of the front lift arms 85 to each other by the coupling pipe 75 whose longitudinal direction coincides with the vehicle width direction. The front ends of the front lift arms 85 are attached to the work unit 78 through the work unit brackets 77. The front ends of the front lift arms 85 are pivotally supported on the work unit brackets 77. Accordingly, the work unit brackets 77 and the work unit 78 can be vertically rotatable with respect to the pair of left and right lift arms 74.

Each of the work unit links 76 is constituted by an arm-side link member 76a and a work unit-side link member 76b. The lower ends of the arm-side link members 76a are pivotally supported on longitudinally intermediate portions of the front lift arms 85. The lower ends of the work unit-side link members 76b are pivotally supported on upper portions of the work unit brackets 77.

The work unit cylinders 80 are attached to upper portions of the front ends of the lift arms 74. The upper ends of the arm-side link member 76a and the work unit-side link member 76b pivotally support distal ends of the piston rods of the work unit cylinders 80. The distal ends of the work unit cylinders 80 are pivotally supported on upper portions of the front ends of the rear lift arms 84. The pair of left and right work unit cylinders 80 serves as actuators for rotating the work unit brackets 77 in a longitudinal direction (front-rear direction). Simultaneous extension and contraction of the piston rods of the pair of left and right work unit cylinders 80 adjust the bending angles of the work unit links 76, that is, the angle formed by the arm-side link member 76a and the work unit-side link member 76b so that longitudinal rotation angle of the work unit brackets 77 with respect to the lift arms 74 can be adjusted.

Figure 6:
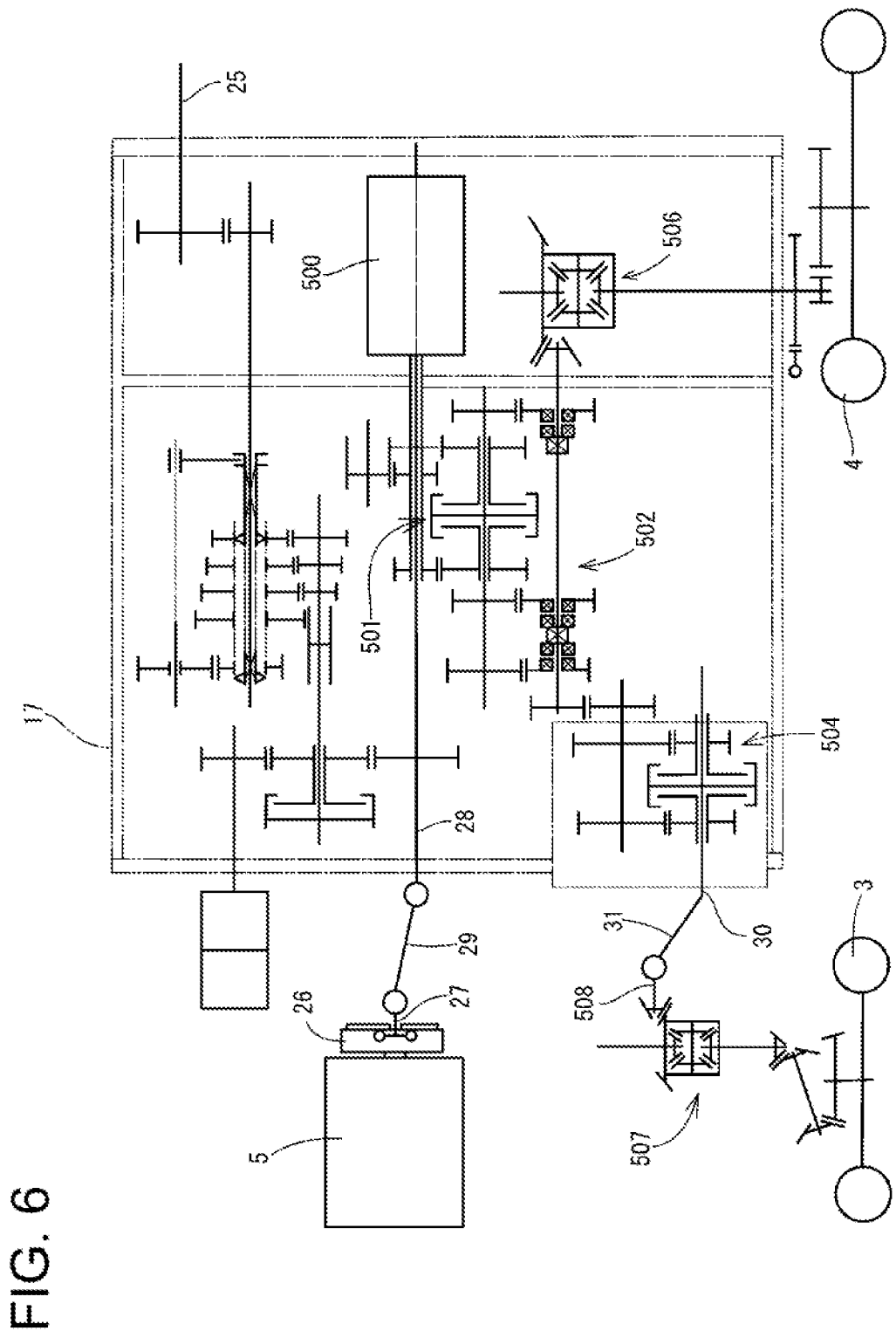
Figure 7:
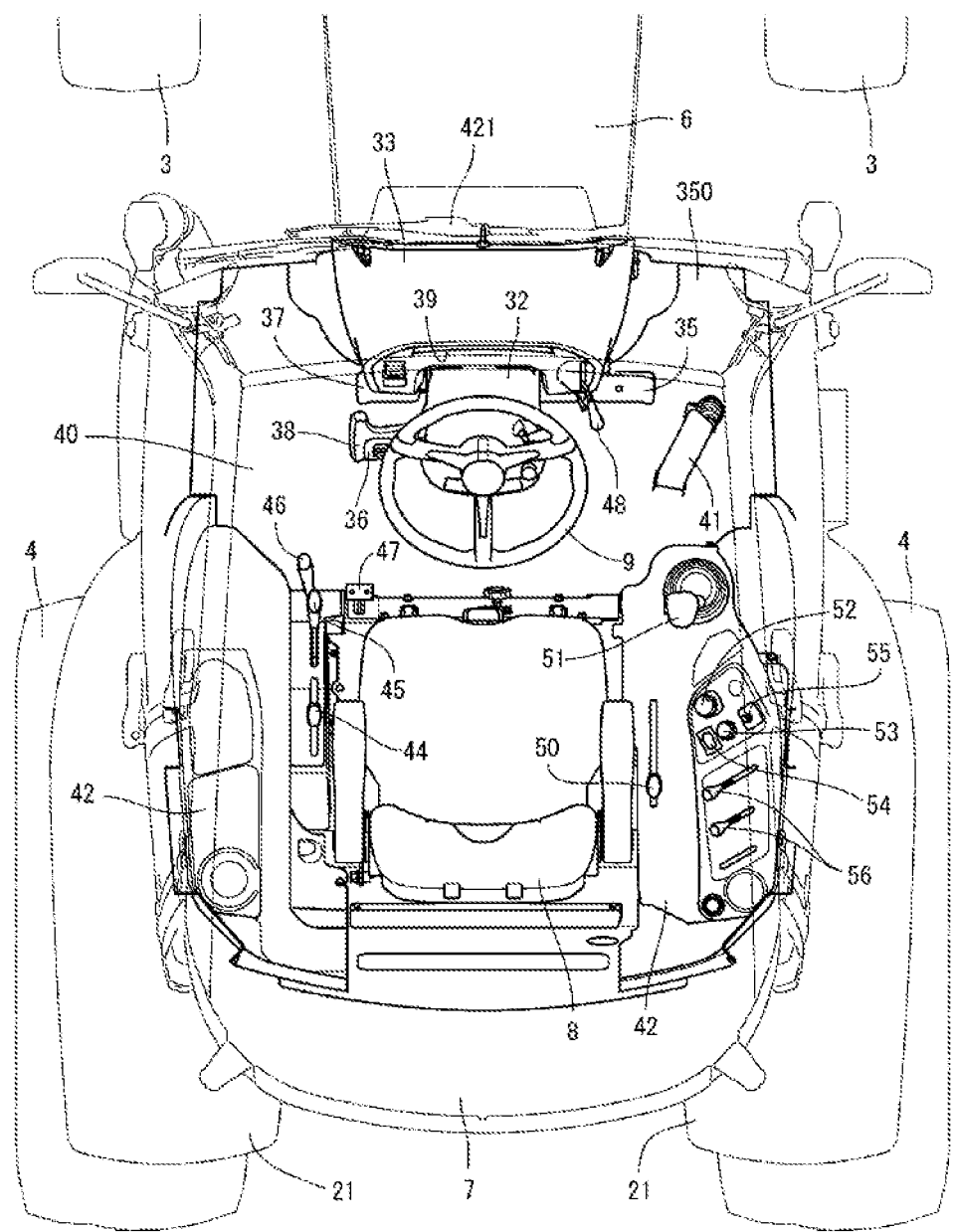
Figure 8:
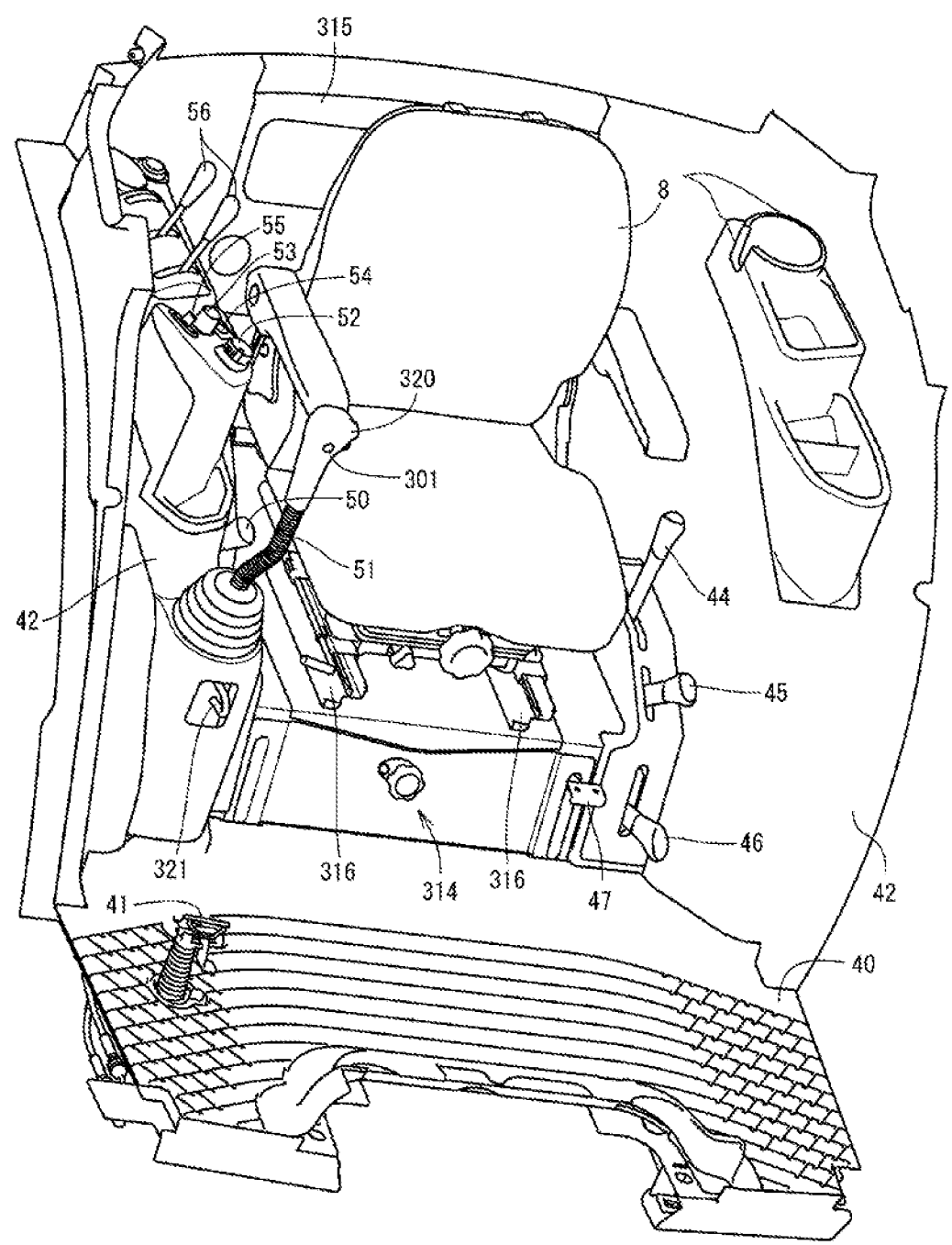
Figure 9:
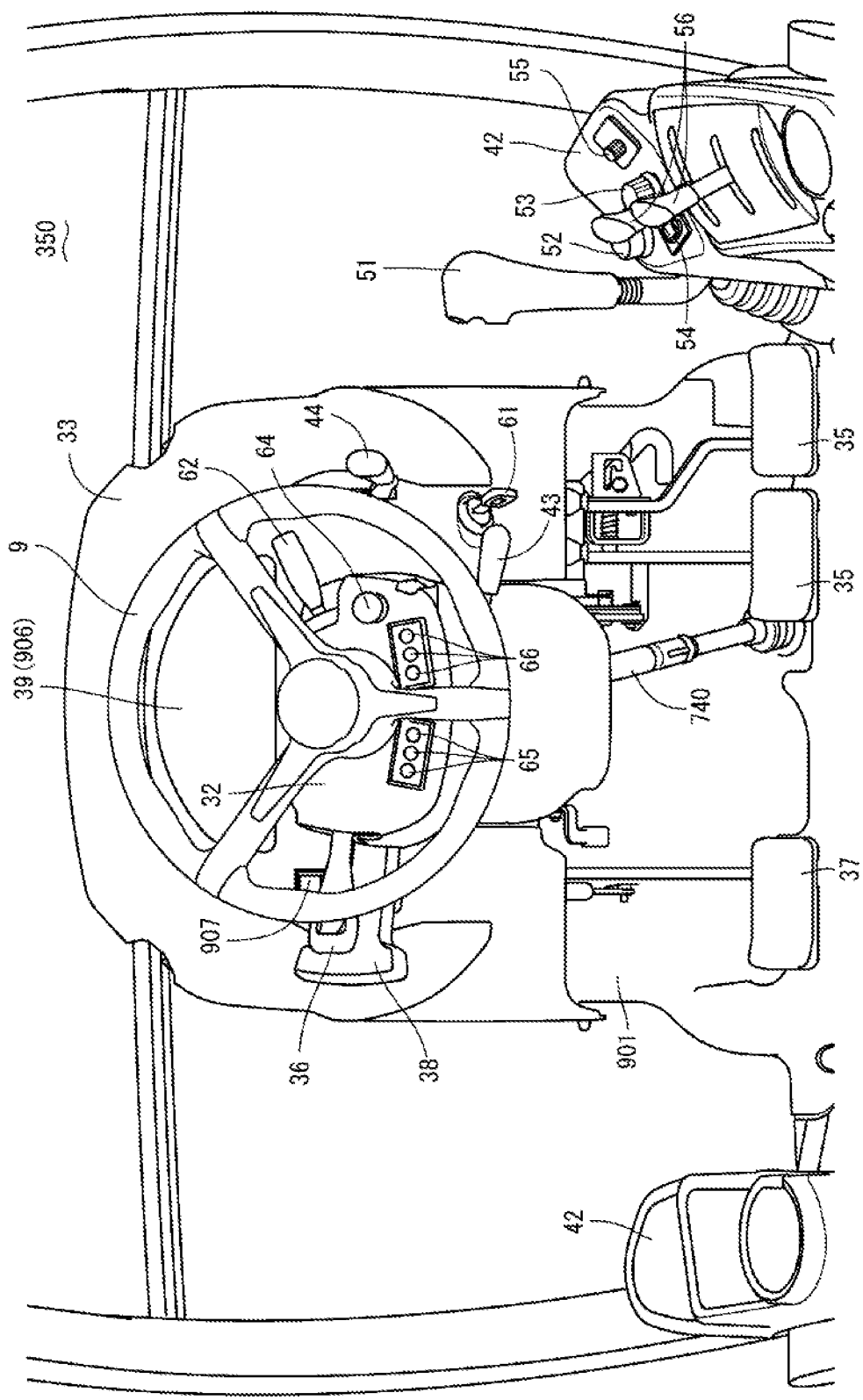
Figure 10:
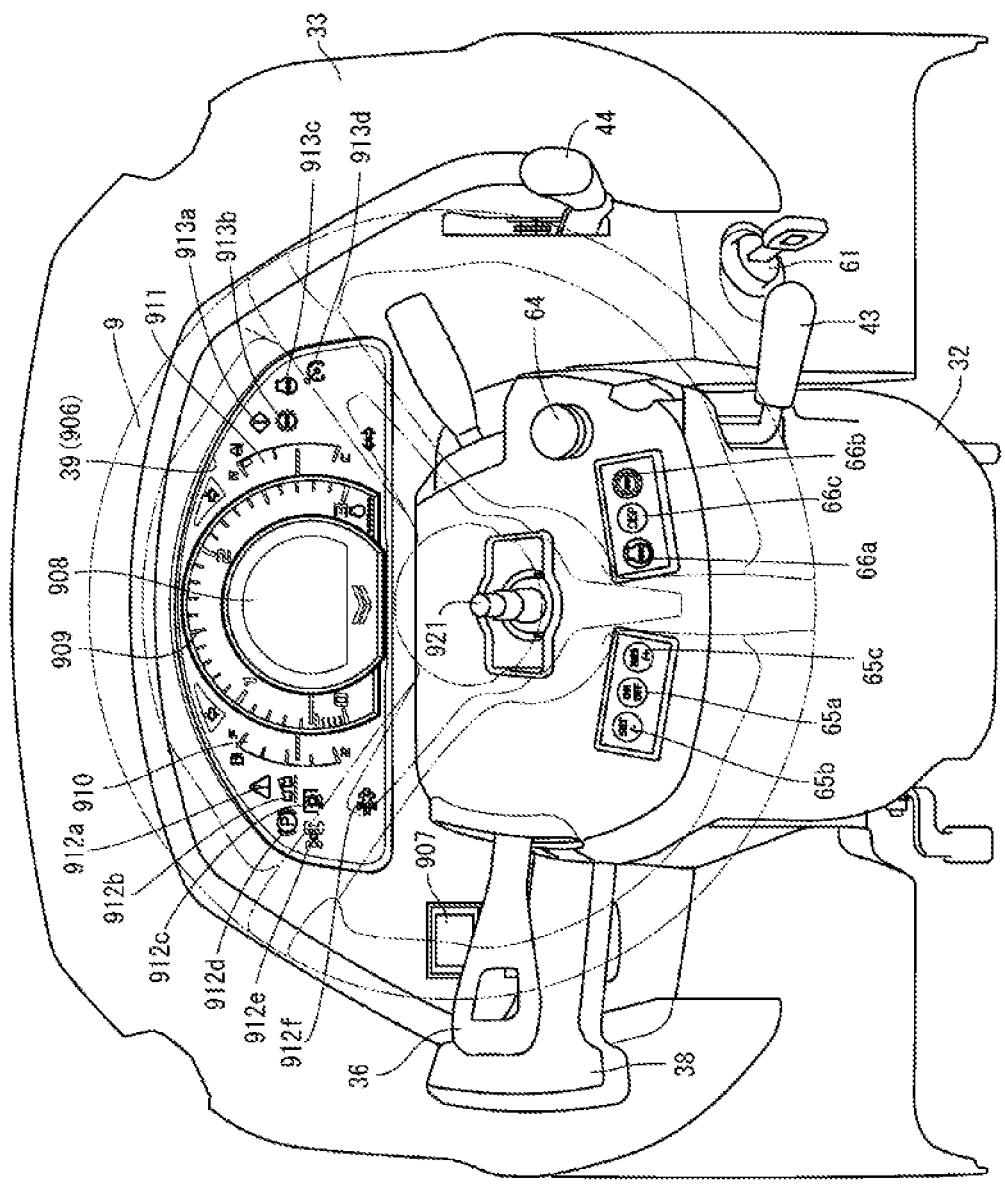

As illustrated in FIG. 6, a flywheel 26 is coupled to the output shaft (piston rod) of the engine 5 projecting rearward from the rear side surface of the engine 5. A main driving shaft 27 projecting rearward from the flywheel 26 and a main gear-shift input shaft 28 projecting forward from the front surface of the transmission case 17 are coupled to each other through a driving force transfer shaft 29 including universal joints on both ends. Inside the transmission case 17, a hydraulic stepless transmission 500, a forward/reverse switching mechanism 501, a sub-gear shift mechanism 502, a two-wheel drive/four-wheel drive switching mechanism 504, and a rear-wheel differential gear mechanism 506, for example, are disposed.

A rotative force of the engine 5 is transferred to the main gear-shift input shaft 28 of the transmission case 17 by way of the main driving shaft 27 and the driving force transfer shaft 29, and subjected to a speed shift by the hydraulic stepless transmission 500 and the sub-gear shift mechanism 502, and the shifted force is transferred to the left and right rear wheels 4 through the rear-wheel differential gear mechanism 506. At this time, the forward/reverse switching mechanism 501 switches the shifted force from the hydraulic stepless transmission 500 from forward to reverse or from reverse to forward, and the resulting force is transferred to the sub-gear shift mechanism 502.

A front wheel output shaft 30 projecting forward from a lower portion of the front surface of the transmission case 17 is coupled to a front wheel transmission shaft 508 projecting rearward from the front axle case 13 incorporating a front-wheel differential gear mechanism 507 through a front-wheel driving shaft 31. The shifted driving force, obtained by the hydraulic stepless transmission 500 and the two-wheel drive/four-wheel drive switching mechanism 504 in the transmission case 17, is transferred to the left and right front wheels 3 from the front wheel output shaft 30, the front-wheel driving shaft 31, and the front wheel transmission shaft 508 by way of the front-wheel differential gear mechanism 507 in the front axle case 13.

Next, with reference to FIGS. 7 through 11, for example, an inner configuration of the cabin 7 will be described. A steering column 32 is disposed ahead of the cockpit seat 8 in the cabin 7. The steering column 32 stands on the rear surface of a dashboard 33 disposed at the front inner surface of the cabin 7. The steering wheel 9 having a substantially circular shape in plan view is attached to the upper end of a steering shaft projecting upward from the upper surface of steering column 32.

A pair of left and right brake pedals 35 for braking the traveling body 2 is disposed below the right of the steering column 32. The forward/reverse switching lever 36 (reverser lever) for switching the traveling direction of the traveling body 2 between forward and reverse is disposed above the left of the steering column 32. A clutch pedal 37 for shutting off an output of the hydraulic stepless transmission 500 is disposed below the left of the steering column 32.

A misoperation preventing member 38 (reverser guard) extending along the forward-reverse switching lever 36 is disposed at the left of the steering column 32 below the forward-reverse switching lever 36. The misoperation preventing member 38 as a contact preventing member, which projects outward from the forward/reverse switching lever 36, can prevent an accidental contact of an operator with the forward/reverse switching lever 36 when the operator takes on or off the tractor 1. An operation display board 39 incorporating a liquid crystal panel is disposed on an upper portion of the rear surface of the dashboard 33.

A parking brake lever 43 for maintaining a braking state of the left and right rear wheels 4 and an accelerator lever 48 for setting and holding the number of revolutions of the engine 5 are disposed at the right of the steering column 32. That is, the accelerator lever 48 is inserted in the dashboard 33 to be located at the right of the steering column 32, and the proximal end of the accelerator lever 48 is fixed to be rotatable in the dashboard 33. An accelerator lever sensor 48a of a potentiometer (variable resistor) that detects a vertical tilt of the accelerator lever 48 is provided in the dashboard 33. On the other hand, the brake lever 43 is disposed at a position below the accelerator lever 48, and the proximal end of the brake lever 43 is located in the steering column 32.

A main gear shift pedal 41 for controlling the number of revolutions of the engine 5 or the vehicle speed, for example, is disposed at the right of the steering column 32 on a floor plate 40 ahead of the cockpit seat 8 in the cabin 7. The substantially entire upper surface of the floor plate 40 is flat. A pedal sensor (gear-shift position sensor) 41a of a potentiometer (variable resistor) type that detects a vertical tilt of the main gear shift pedal 41 is fixed below at the bottom of the floor plate 40.

Left and right side columns 42 are disposed at the left and right of the cockpit seat 8. A sub-gear shift lever 44 for switching the output range of a traveling sub-gear shift mechanism 503 in the transmission case 17, a four-wheel drive lever 45 for switching the front and rear wheels 3 and 4 between two-wheel drive and four-wheel drive, and a PTO gear shift lever 46 for switching the drive speed of the PTO shaft 25 are disposed between the cockpit seat 8 and the left side column 42. A diff-lock pedal 47 for activating and deactivating differential driving of the left and right rear wheels 4 are disposed below the cockpit seat 8. A work unit position lever 50 for adjusting the height position of the ground work machine such as a rotary tiller is disposed between the cockpit seat 8 and the right side column 42.

A loader lever 51 for switching the loader valve 71, a PTO clutch switch 52 for engaging and disengaging a driving force transfer from the PTO shaft 25 to a work machine such as a rotary tiller, a revolution number/vehicle speed setting dial 53 for previously setting a maximum number of revolutions of the engine 5 or a maximum traveling speed of the traveling body 2, a revolution number/vehicle speed selecting switch 54 for specifying a value set by the revolution number/vehicle speed setting dial 53 as the maximum number of revolutions of the engine 5 or the maximum traveling speed of the traveling body 2, a vehicle speed sensitivity adjusting dial 55 for adjusting an acceleration/deceleration rate of the vehicle speed in, for example, an operation of the main gear shift pedal 41, and a plurality of hydraulic operation levers 56 (SCV levers) for switching hydraulic pressure output valves 430 disposed on the upper surface of the transmission case 17 are arranged in this order from the front on the right side column 42. Here, the hydraulic pressure output valve 430 is used for controlling supply of hydraulic oil to hydraulic equipment of a work machine such as a rotary tiller or compost casters retrofitted to the tractor 1. In this embodiment, two hydraulic operation levers 56 are disposed in conformity with the number (two) of hydraulic pressure output valves.

The dashboard 33 covers the rear of a front windowpane 350 and incorporates a wiper driving mechanism 422. The wiper driving mechanism 422 is constituted by a drive motor for generating a rotative force to a wiper 421 pivotally supported on the front windowpane 350 and a gear mechanism for transferring the rotative force of the drive motor to the wiper 421. A meter panel 906 is fixed to the dashboard 33, and is integrally configured with a meter controller (meter ECU) 904 electrically connected to the meter panel 906, and the meter controller 904 is buried in the dashboard 33.

The meter panel 906 is disposed with the panel surface slightly tilted upward from the rear so as to face an operator seated on the cockpit seat 8 at a position below the front of the steering wheel 9. A plurality of switch members 907 such as a parking switch are disposed at the periphery of the meter panel 906 on the dashboard 33. A key switch 61 is a rotary switch that can be rotated with a predetermined key inserted in a keyhole, and is attached at the right of the steering wheel 9 on the dashboard 33.

A liquid crystal panel 908 for displaying characters and the like is disposed on a center display region of the meter panel 906 as a driving operation display device, and an engine speed indicator 909 that indicates the number of revolutions of the engine 5 with a needle is disposed at the periphery of the liquid crystal panel 908. On the meter panel 906, a fuel indicator 910 indicating the amount of remaining fuel with a needle and is disposed at the left of the engine speed indicator 909, and a coolant temperature gauge 911 indicating a coolant temperature of the engine 5 with a needle is disposed at the right of the engine speed indicator 909.

The meter panel 906 is also provided with a plurality of display lamps 912a through 912f and 913a through 913d such as LEDs disposed in display regions at the left and right outer sides (outside the center display region) of the engine speed indicator 909. The display lamps 912a through 912f and 913a through 913d at the left and right of the engine speed indicator 909 serve as a warning lamp and a pilot lamp. In this embodiment, one of the display lamps 912a through 912f is allocated to a regeneration lamp 912f indicating a regeneration process state of the exhaust gas purifying device 224, and the display lamps 913a through 913d are allocated to indicator lamps indicating ON/OFF states of anti-stall control, accelerator cooperation control, and auto-cruise control.

The steering column 32 stands on and is partially buried in the rear surface of the dashboard 33. A vertically elongated steering shaft 921 is pivotally supported in the steering column 32. The upper end of the steering shaft 921 projects upward from the upper surface of the steering column 32. The steering wheel 9 having the substantially circular shape in plan view is attached to the upper end of the steering shaft 921. The lower end of the steering shaft 921 is coupled to the distal end of the vertically elongated steering shaft 740 through a universal joint. The proximal end of the steering shaft 740 is coupled to a power steering hydraulic mechanism 621 supported on a lower portion of a board support plate (air-cut plate) 901 through a universal joint.

The upper surface of the steering column 32 at the proximal portion of the steering wheel 9 is provided with a DPF regeneration switch 64 for executing regeneration control of the exhaust gas purifying device 224. That is, the DPF regeneration switch 64 is disposed in the field of view of an operator at a straight-ahead traveling work position. Thus, the DPF regeneration switch 64 is not hidden by, for example, the steering wheel 9, and a seated operator can easily visually recognize the position and a lighting display state of the DPF regeneration switch 64.

On the upper surface of the steering column 32, a plurality of switches 65 and 66 such as a traveling switch and a one-touch automatic switch are disposed at positions symmetric with respect to the steering shaft 921 of the steering wheel 9. Accordingly, a seated operator can visually recognize the group of switches 65a through 65c and 66a through 66c disposed on the upper surface of the steering column 32 to easily determine the positions of the traveling switch and the one-touch automatic switch. Thus, misoperations can be reduced.

The switches 65a through 65c and 66a through 66c such as the DPF regeneration switch 64, the traveling switch, and the one-touch automatic switch are disposed on the supper surface of the steering column 32 at a proximal portion of the steering wheel 9. The DPF regeneration switch 64 is disposed on the upper surface of a side portion of the steering column 32 above the brake pedals 35. On the other hand, the switches 65a through 65c and 66a through 66c such as the traveling switch and the one-touch automatic switch are disposed with spokes of the steering wheel 9 disposed on the longitudinal center line of the traveling body 2 sandwiched therebetween. In this embodiment, the left switches 65a through 65c are traveling switches (auto-cruise operation switches) and the right switches 66a through 66c are one-touch automatic switches (accelerator cooperation control switch 66a, anti-stall switch 66b, and display switch).

Figure 11:
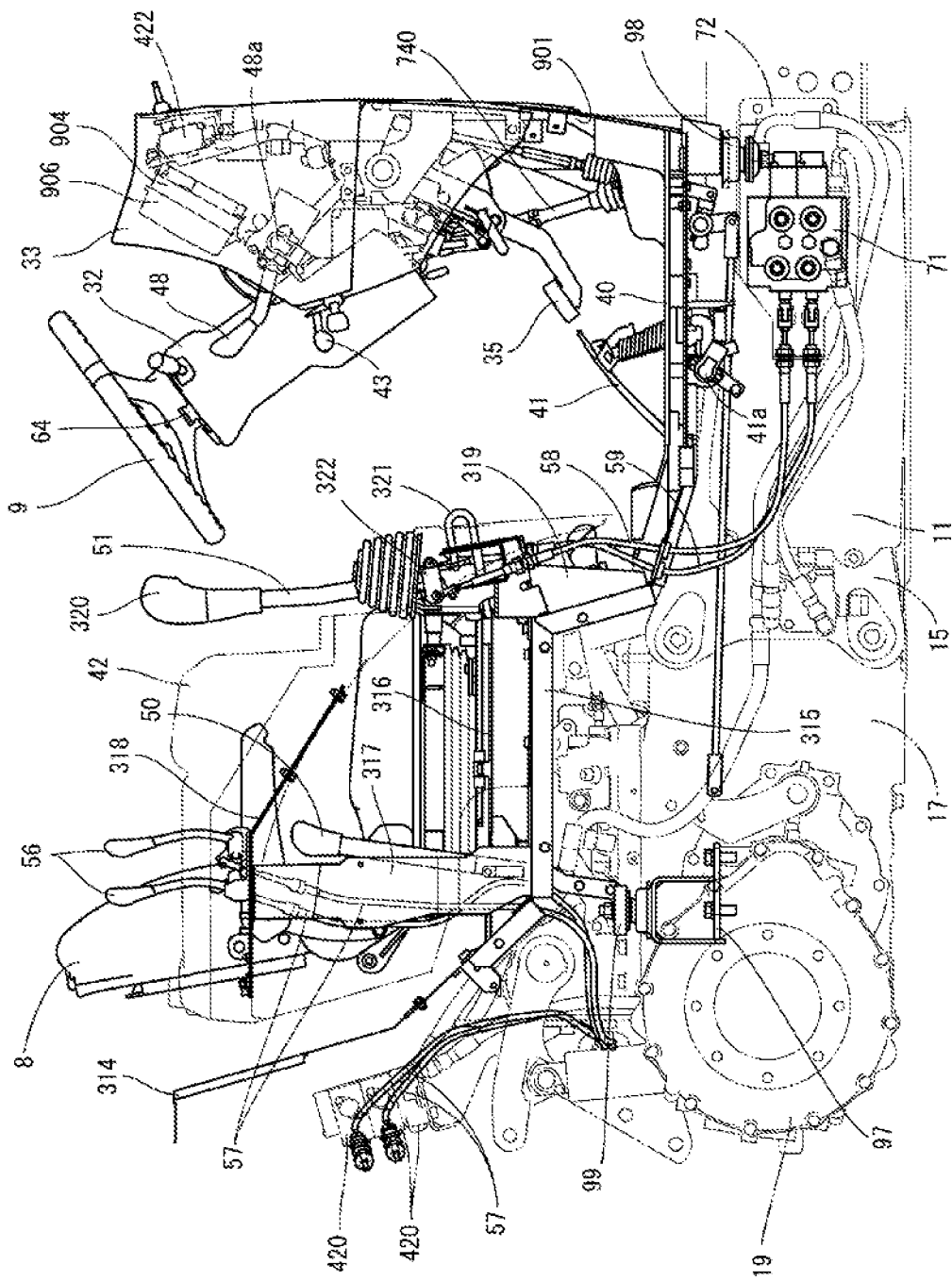
Figure 12:
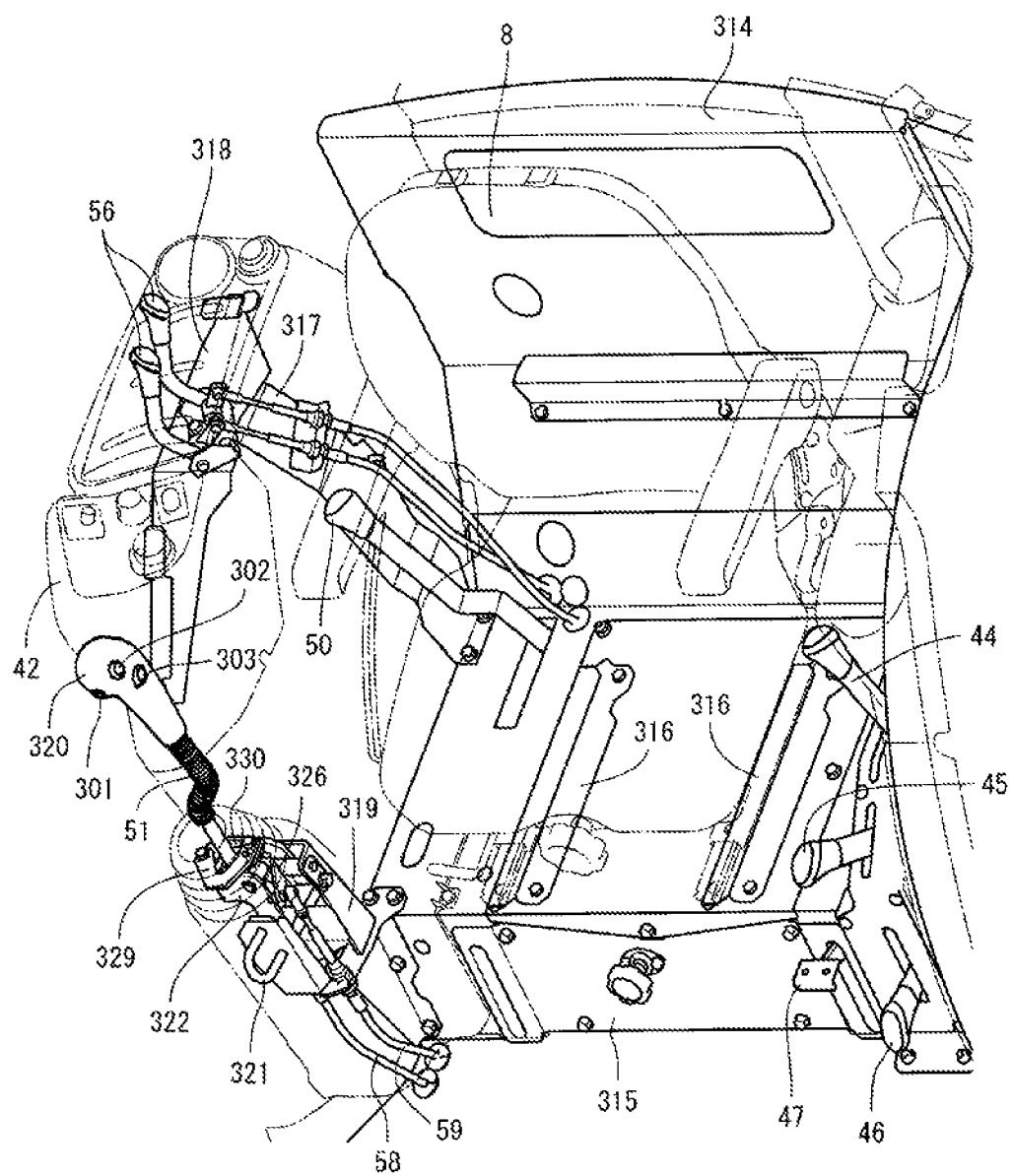

As illustrated in FIGS. 11 and 12, in the cabin 7, a seat support plate 315 having an L-plate shape in side view stands on the floor plate 40, and the cockpit seat 8 is disposed on the seat support plate 315 Rail members 316 for sliding the cockpit seat 8 in the longitudinal direction are fixed on the upper surface of the seat support plate 315, and a bottom portion of the cockpit seat 8 is locked with the rail members 316. A rear cover plate 314 is coupled to the rear edge of the seat support plate 315 so that the rear cover plate 314 thereby stands to cover a rear portion of the cockpit seat 8.

A support plate 317 stands on the right edge at the rear of the seat support plate 315, and a lever fixing bracket 318 is fixed to the upper edge of the support plate 317. The lever fixing bracket 318 is also coupled to the right side column 42 to be thereby disposed inside the right side column 42. The hydraulic operation levers 56 is placed and fixed on the upper surface of the lever fixing bracket 318, and grips (grip portions) of the hydraulic operation levers 56 project outward of the right side column 42. The hydraulic operation levers 56 are coupled to the hydraulic pressure output valve 430 through push-pull wires 57 fixed to the lever fixing bracket 318.

Figure 13:
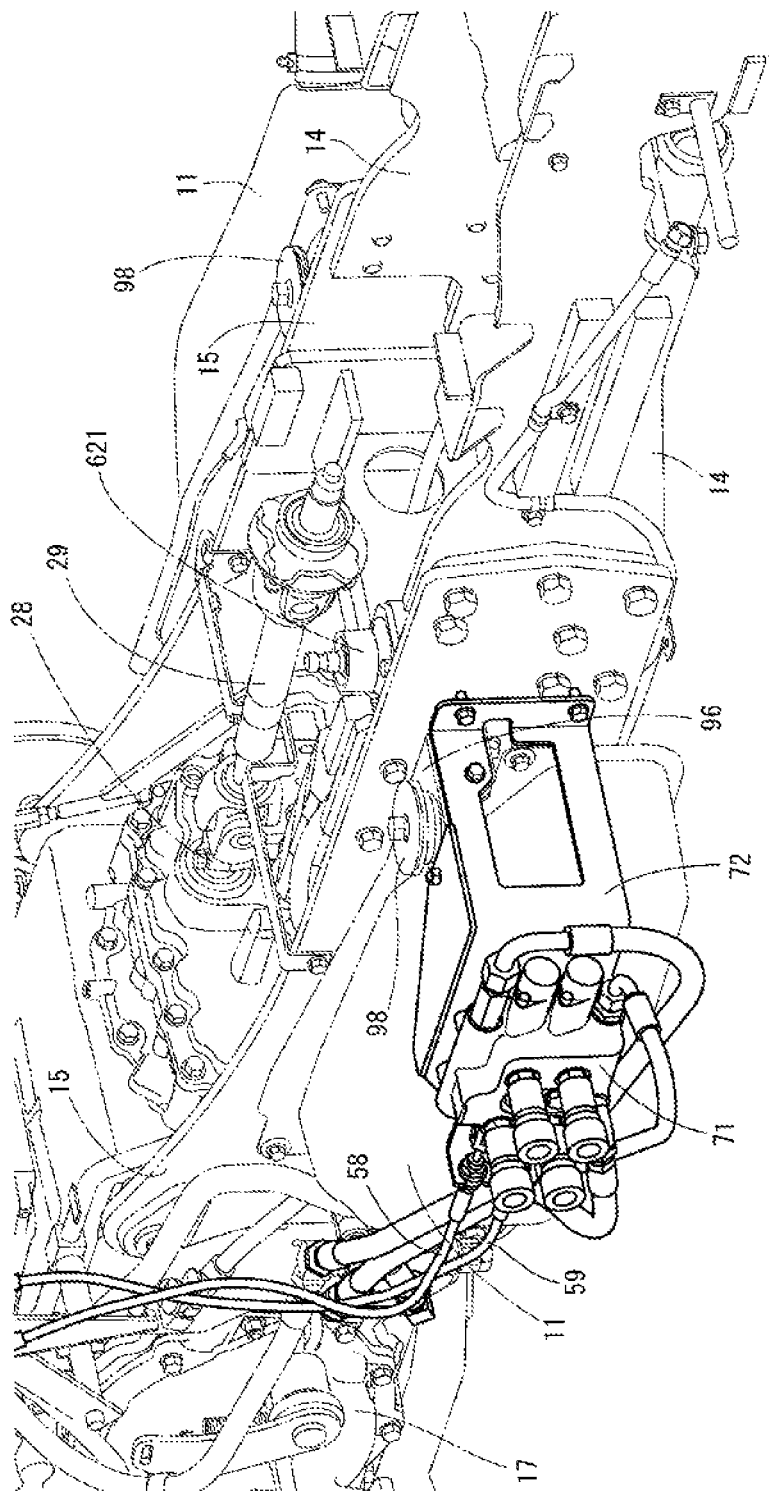

As illustrated in FIGS. 11 through 13, the lever fixing bracket 319 is fixed to the front surface of a right side portion of the seat support plate 315, and the loader lever 51 is slidably supported on the lever fixing bracket 319. The lever fixing bracket 319 is covered with the right side column 42, and a grip (grip portion) 320 of the loader lever 51 projects from the upper surface of the right side column 42. The loader lever 51 has a crank shape, and the grip 320 is disposed toward the side of the cockpit seat 8. That is, the loader lever 51 is fixed at a position ahead of the right side column 42, and the grip 320 is disposed ahead of the right of the cockpit seat 8 at which an operator can perform an operation easily. Thus, operability of the front loader 70 can be enhanced. The loader lever 51 is coupled to the loader valve 71 through the push-pull wires 58 and 59 fixed to the lever fixing bracket 319.

A lock metal fitting 321 for locking a tilt of the loader lever 51 is provided to be insertable and removable into/from the lever fixing bracket 319 The lock metal fitting 321 has a U shape, and a bent portion of the lock metal fitting 321 projects from the front surface of the right side column 42 so that the operator can easily hold the lock metal fitting 321. Thus, the operator can easily insert and remove the lock metal fitting 321 depending on the presence of an operation of the front loader 70. By inserting the lock metal fitting 321 into the lever fixing bracket 318, a tilt of the loader lever 51 can be inhibited (locked), and thus, an accidental operation to the front loader 70 can be avoided.

As illustrated in FIG. 13, for example, the loader valve 71 is fixed to the body frame 15 through the valve support bracket 72 having an L shape in plan view. The valve support bracket 72 is disposed around the front of the fuel tanks 11, and accordingly, the loader valve 71 is disposed outside the fuel tanks 11. Accordingly, while a sufficient capacity of the fuel tanks 11 is obtained, the loader valve 71 can be easily coupled to the push-pull wires 58 and 59, and easiness in assembly can be enhanced. In addition, the valve support bracket 72 is also coupled to the front supporting platforms 96 fixed to the body frame 15, and thus, the valve support bracket 72 can be supported with high stiffness.

Figure 14:
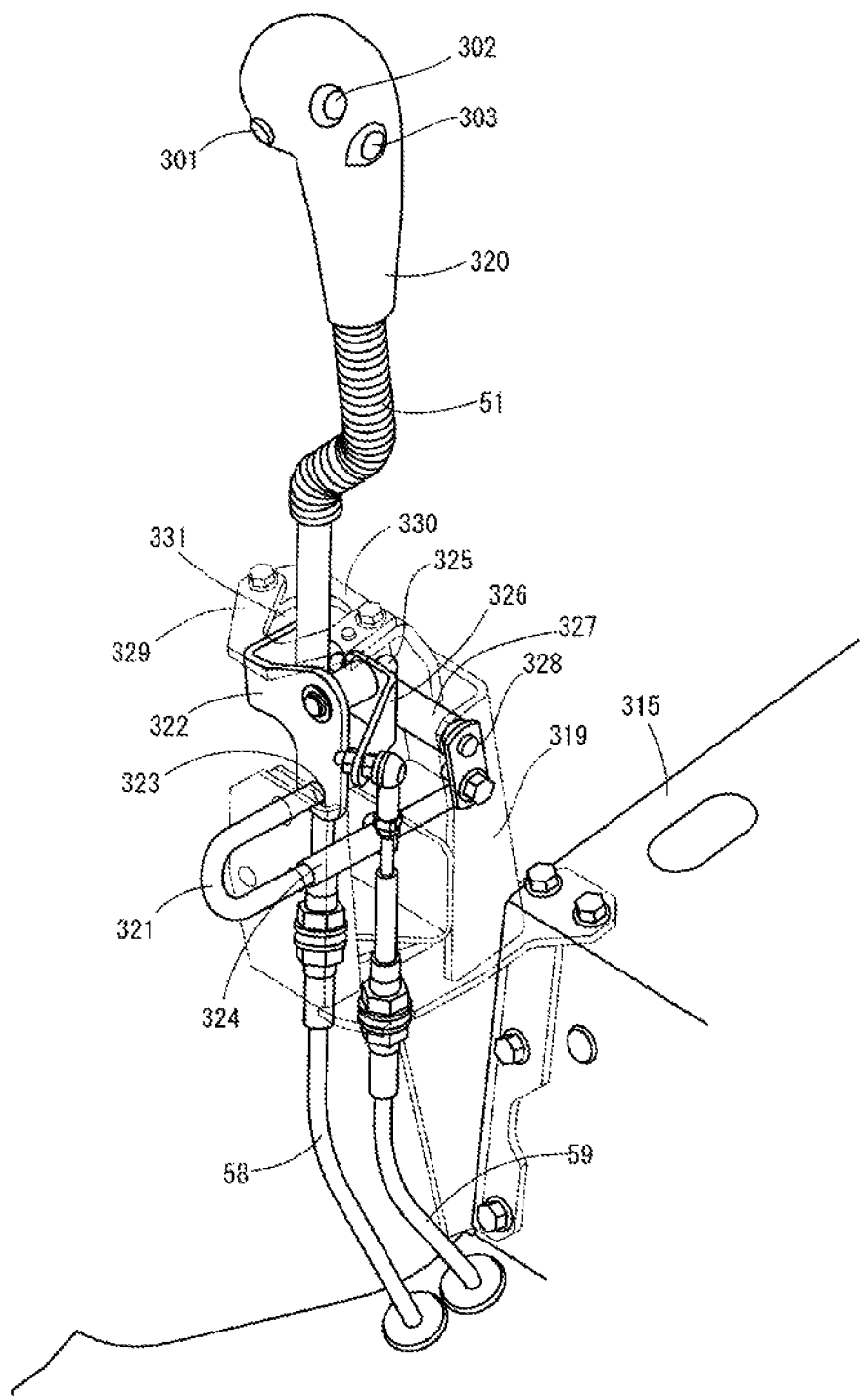
Figure 15:
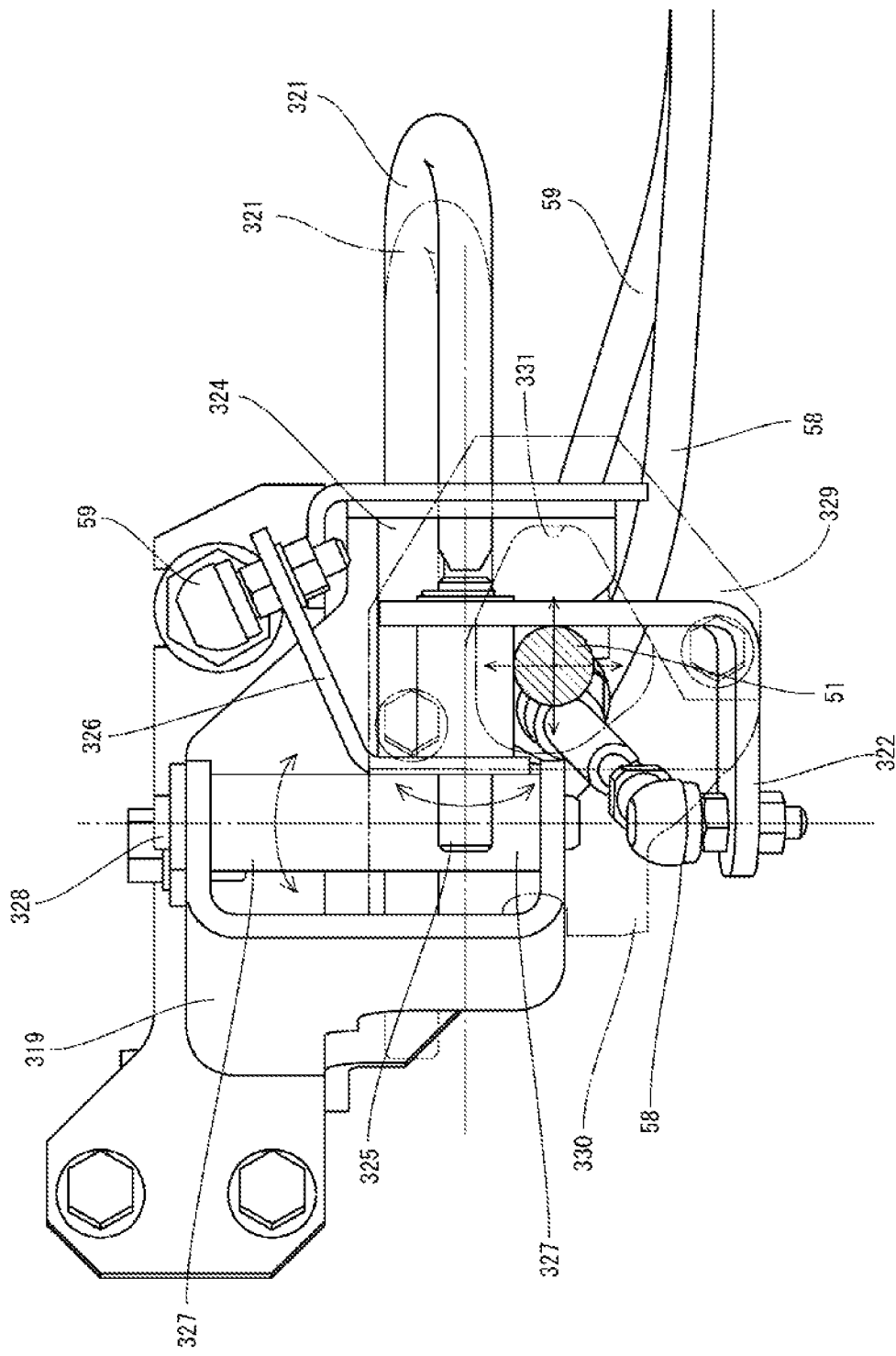

As illustrated in FIGS. 14 and 15, the proximal end of the loader lever 51 is fixed to an intermediate portion of a lateral tilt link 322, and the distal end of the loader lever 51 is fitted in the grip 320. The lateral tilt link 322 is constituted by a V-shaped metal plate branched into two parts from a coupling portion of the lateral tilt link 322 to the proximal end of the loader lever 51, and one of the two parts is bent rearward to form an L shape in plan view.

The distal end of the push-pull wire 58 is coupled to one end of the lateral tilt link 322 at the rear, and a through hole 323 into/from which an end of the lock metal fitting 321 is inserted and removed is provided in the other end of the lateral tilt link 322 below the front surface. The other end of the lock metal fitting 321 is inserted in a guide pipe 324 fixed to the lever fixing bracket 319, and slides along the direction in which the guide pipe 324 extends. That is, when one end of the lock metal fitting 321 is inserted in the through hole 323 of the lateral tilt link 322, a tilt operation of the loader lever 51 is thereby locked, and when the end of the lock metal fitting 321 is removed from the through hole 323 of the lateral tilt link 322, the locking of the tilt operation of the loader lever 51 is canceled.

A shaft body 325 extending rearward is disposed at a bent portion of the lateral tilt link 322 above the through hole 323 (bent portion near a coupling portion of the lateral tilt link 322 to the proximal end of the loader lever 51). The shaft body 325 is inserted through the longitudinal tilt link 326 so that the lateral tilt link 322 is pivotally supported on the longitudinal tilt link 326 to be slidable laterally. That is, with a lateral tilt operation of the loader lever 51, the lateral tilt link 322 slides laterally to move the distal end of the push-pull wire 58 upward and downward.

The longitudinal tilt link 326 has one end in which the shaft body 325 is inserted and has the other end bent forward to be coupled to the distal end of the push-pull wire 59. A cylindrical boss 327 extending laterally is fixed to one end of the longitudinal tilt link 326, and the shaft body 328 fixed to the lever fixing bracket 319 is inserted in the boss 327. Accordingly, the longitudinal tilt link 326 is pivotally supported by the lever fixing bracket 319 to be slidable longitudinally. That is, with the longitudinal tilt operation of the loader lever 51, the lateral tilt link 322 slides laterally to move the distal end of the push-pull wire 59 upward and downward.

A portion of the lateral tilt link 322 coupled to the push-pull wire 58 is located on a line extending from an axis of the shaft body 325. Thus, when the loader lever 51 tilts longitudinally, the lateral tilt link 322 slides together with the longitudinal tilt link 326. At this time, the position of the distal end of the push-pull wire 58 coincides with a fulcrum of rotation of the longitudinal tilt link 326, and thus, a longitudinal tilt operation of the loader lever 51 does not act on the push-pull wire 58.

The lever fixing bracket 319 constitutes a restriction hole 331 for restricting a tilt range of the loader lever 51 by coupling both ends of each of the two U-shaped metal fittings 329 and 330 to each other above the lever fixing bracket 319. The restriction hole 331 is configured to have its lateral width and longitudinal width increase at a neutral position of the loader lever 51. The restriction hole 331 is formed to have its opening portion decrease symmetrically toward the front, and have its opening portion decrease at the right toward the rear.

The push-pull wire 59 is pushed and pulled in accordance with the longitudinal tilt operation of the loader lever 51 so that an arm valve (not shown) in the loader valve 71 acts. Accordingly, the arm cylinders 79 are driven to extend and contract to thereby rotate the left and right lift arms 74 upward and downward, resulting in a lifting and lowering operation of the work unit 78. In addition, the push-pull wire 58 is pushed and pulled in accordance with the loader lever 51, and thereby, a work unit valve (not shown) in the loader valve 71 acts. Accordingly, the work unit cylinders 80 is driven to extend and contract to thereby rotate the work unit 78 upward and perform a tilt operation of scooping oil or the like, and to rotate the work unit 78 downward to perform a dump operation of dropping the soil or the like.

The front surface of the grip 320 is provided with an engine blipping switch 301, and the left side surface of the grip 320 is provided with a valve operation switch 302 and a mode shift switch 303. That is, since the grip 320 is held with the right hand of the operator, the engine blipping switch 301 is located at a position at which the engine blipping switch 301 can be operated with, for example, a forefinger, and the valve operation switch 302 and the mode shift switch 303 are located at positions at which the valve operation switch 302 and the mode shift switch 303 can be operated with a thumb. Thus, the operator can easily operate the switches 301 through 303 while holding the loader lever 51 in a loader work by the front loader 70.

Figure 16:
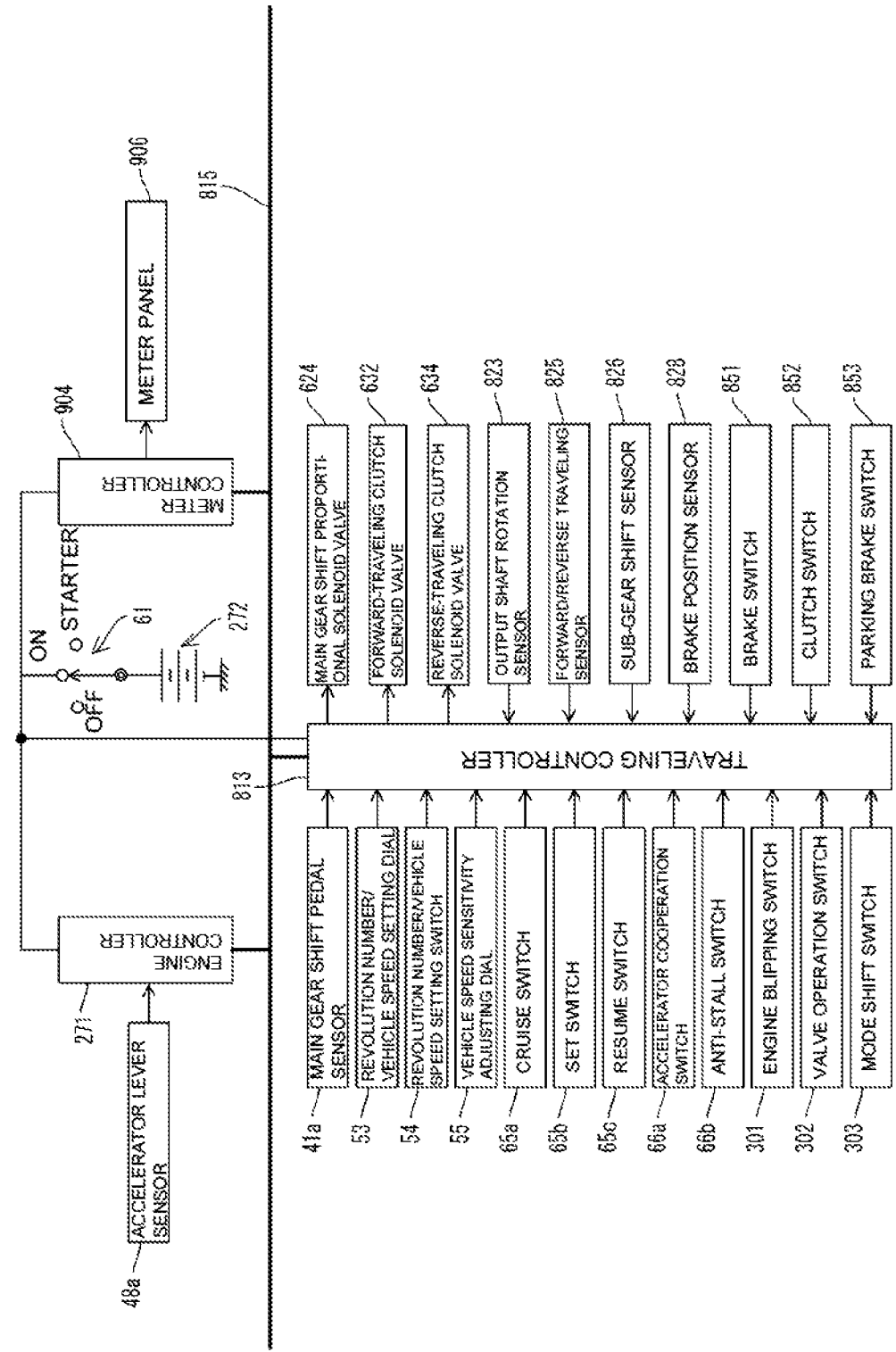

As illustrated in FIG. 16, the tractor 1 includes an engine controller (engine ECU) 271 for controlling driving of the engine 5, a meter controller (meter ECU) 904 for controlling a display operation of the meter panel 906 mounted on the dashboard 33, and a traveling controller 813 for, for example, controlling the speed of the traveling body 2. Each of the controllers 271, 813, and 904 includes, as well as a CPU for executing various computation processes and controls, a ROM for storing control programs and data, a RAM for temporarily storing control programs and data, a timer for measuring time, and an input/output interface, for example. The he controllers 271, 813, and 904 are connected to each other through CAN communication buses 815 to enable communication with each other.

Based on control by the engine controller 271, in the engine 5, fuel in the fuel tank is pumped to a common rail 207 by a fuel pump, and is stored as high-pressure fuel in the common rail 207. The engine controller 271 controls opening and closing (electrically controls) each fuel injection valve so that high-pressure fuel in the common rail 207 is injected from each injector (not shown) to each cylinder of the engine 5 with an injection pressure, an injection time, and an injection period (injection amount) of the fuel being highly accurately controlled. The accelerator lever sensor 48a for detecting an operation position of the accelerator lever 48 is connected to an input side of the engine controller 271.

An output side of the meter controller 904 is connected to a liquid crystal panel and various alarm lamps in the meter panel 906. The meter controller 904 outputs various signals to the meter panel 906, and controls lighting and extinguishing operations and blinking operations of the display lamps 912a through 912f and 913a through 913d, a display operation of the liquid crystal panel 908, and a warning operation of an alarm buzzer, for example.

An input side of the traveling controller 813 is connected to a pedal sensor (gear-shift position sensor) 41a for detecting an operation position (foot operation position) of the main gear shift pedal 41, an output shaft rotation sensor (actual vehicle speed sensor) 823 for detecting the output number of revolutions (vehicle speed) and the revolution direction of the hydraulic stepless transmission 500, a forward/reverse traveling sensor 825 for detecting an operation position of the forward/reverse switching lever 36, a sub-gear shift sensor 826 for detecting an operation position of the sub-gear shift lever 44, a brake position sensor 828 for detecting the pressing amount of the brake pedal 35, a brake switch 851 for detecting pressing on the brake pedal 35, a clutch switch 852 for detecting pressing on the clutch pedal 37, and a parking brake switch 853 for detecting an operation of the parking brake lever 43.

An input side of the traveling controller 813 is connected to the engine blipping switch 301, the valve operation switch 302, the mode shift switch 303, the revolution number/vehicle speed setting dial 53, the revolution number/vehicle speed selecting switch 54, the vehicle speed sensitivity adjusting dial 55, the auto-cruise switch 65a, the set switch 65b, the resume switch 65c, the accelerator cooperation switch 66a, and the anti-stall switch 66b. An output side of the traveling controller 813 is connected to a forward-traveling clutch solenoid valve 632 for connecting a clutch in the forward/reverse traveling switching mechanism 501 to a forward side (normal rotation side), a reverse-traveling clutch solenoid valve 634 for connecting a clutch in the forward/reverse traveling switching mechanism 501 to a reverse side (reverse rotation side), and a main gear shift proportional solenoid valve 624 for controlling a transmission ratio of the hydraulic stepless transmission 500.

Figure 17:
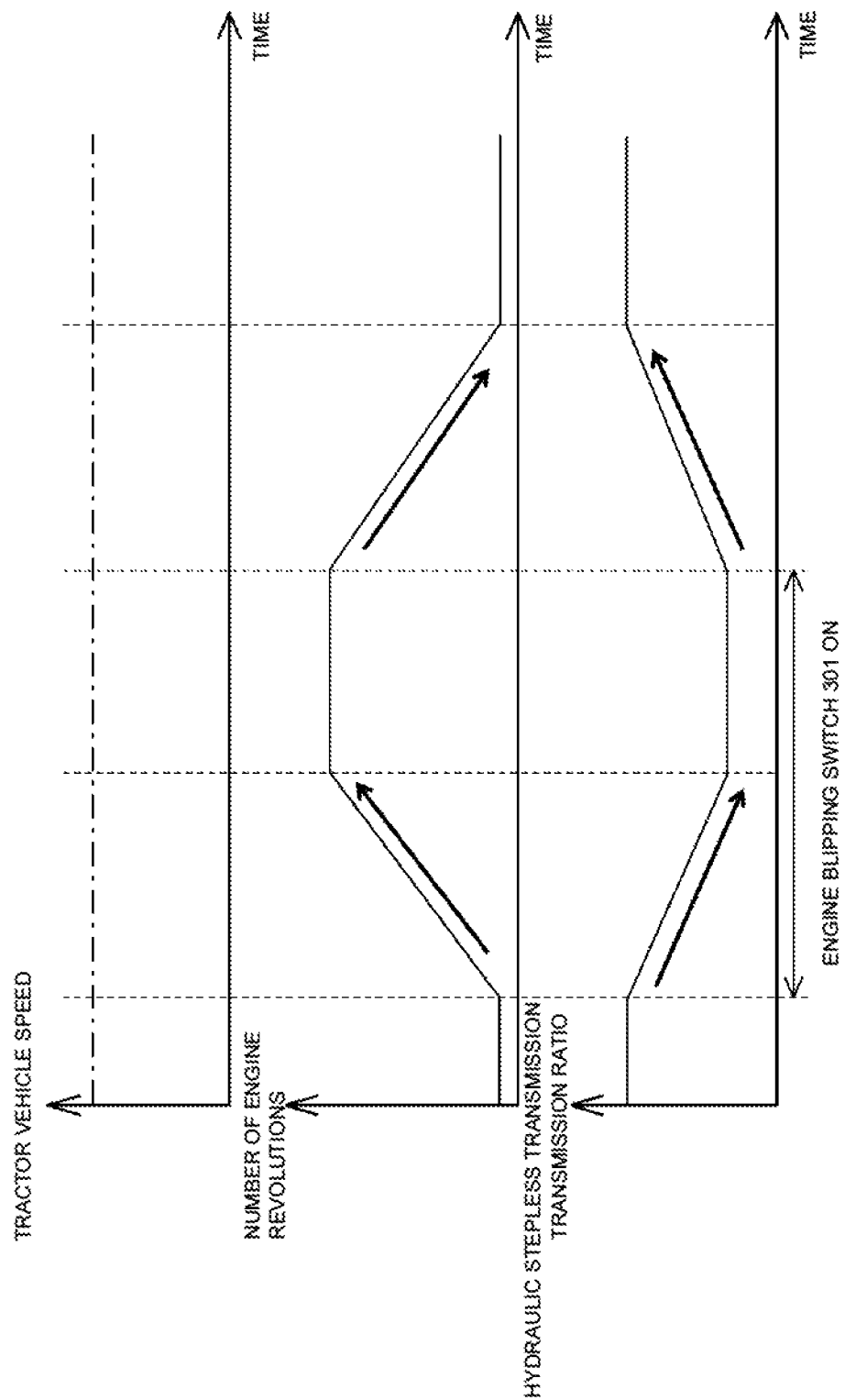

The engine blipping switch 301 is used in, for example, a case where a heavy load is applied during execution of a tilt operation of scooping soil or the like by the front loader 70 or a dozer operation of scraping the ground. As illustrated in FIG. 17, the engine blipping switch 301 is operated to increase the number of revolutions of the engine 5, and to reduce a transmission ratio by the hydraulic stepless transmission 500, thereby performing engine blipping control of keeping the vehicle speed of the tractor 1 constant. The engine blipping control is performed while the engine blipping switch 301 is pressed in a case where a first speed (ultra-low speed) or a second speed (low speed) is specified in sub-gear shift that can be specified up to three speeds (ultra-low speed, low speed, and high speed) by the sub-gear shift lever 44 and a case where mode shift control is not performed by the mode shift switch 303.

While the engine blipping switch 301 is on, the number of revolutions of the engine 5 is increased to a maximum number of engine revolutions set for a traveling mode specified with the mode shift switch 303 described later. At this time, the transmission ratio by the hydraulic stepless transmission 500 is reduced so that the output revolution number from the transmission case 17 is made constant and, thereby, the vehicle speed of the tractor 1 is kept constant. When the engine blipping switch 301 is turned off, the number of revolutions of the engine 5 is reduced to the original number of engine revolutions, whereas the transmission ratio by the hydraulic stepless transmission 500 is increased so that the output revolution number from the transmission case 17 is made constant, and thereby, the vehicle speed of the tractor 1 is kept constant.

As another example, while the engine blipping switch 301 is on, the number of revolutions of the engine 5 may be increased to a maximum number of engine revolutions under no load. In addition, the maximum number of engine revolutions to be increased by performing engine blipping control may be alternatively selected from the maximum number of engine revolutions set for a specified traveling mode and the maximum number of engine revolutions under no load.

By providing the loader lever 51 with the engine blipping switch 301, the operator can determine that heavy-load work is being performed based on the sense of hearing and the sense of sight during loader work by the front loader 70, and at the same time, can easily perform engine blipping control with a hand operating the loader lever 51 (right hand in this embodiment). Thus, even under a load less than the work load, control can be promptly performed based on determination of the operator so that a hydraulic lift to the arm cylinders 79 and the work unit cylinders 80 can be increased. Thus, not only complexity in operating a work machine such as the front loader 70 can be reduced, but also a load on the work machine can be reduced.

The valve operation switch 302 is used in a case where the work unit 78 is provided with a hydraulic cylinder except for the arm cylinders 79 and the work unit cylinders 80, such as a case where a bale grab (not shown) of pinching, for example, a grass roll is used as the work unit 78 of the front loader 70. An operation of the valve operation switch 302 causes a bale grab cylinder in the bale grab serving as the work unit 78 to extend and contact, and thereby can pinch and release the grass roll.

That is, the longitudinal tilt operation of the loader lever 51 causes the arm cylinders 79 to act so that the work unit 78 is lifted and lowered vertically, the lateral tilt operation of the loader lever 51 causes the work unit cylinders 80 to act so that the bale grab serving as the work unit 78 is tilted vertically, and the operation of the valve operation switch 302 of the loader lever 51 causes the bale grab cylinder to act so that an operation of opening and closing the bale grab serving as the work unit 78 can be performed. Accordingly, in the case of using the bale grab as the work unit 78, only the use of the loader lever 51 can perform work of loading a grass roll on a carriage, and thus, operability of the operator can be enhanced.

The mode shift switch 303 is used in the case of performing switching among maximum numbers of engine revolutions and maximum speeds previously set for a plurality of traveling modes. This embodiment is based on the case of two modes of a first mode and a second mode, but setting of three or more modes may be performed. Maximum numbers of engine revolutions and maximum vehicle speeds in the first and second modes are set by operating the revolution number/vehicle speed setting dial 53 and the revolution number/vehicle speed selecting switch 54 serving as revolution number/vehicle speed setting operation tools. As the maximum number of engine revolutions and the maximum vehicle speed set in each of the first and second modes, the number of revolutions of the engine 5 and the vehicle speed of the tractor 1 at maximum positions of the accelerator lever 48 and the main gear shift pedal 41 are set.

An operation of the mode shift switch 303 causes switching between the first mode and the second mode to be performed. In accordance with the operation of the mode shift switch 303, the maximum numbers of engine revolutions and the maximum vehicle speeds in the first and second modes are switched. In this embodiment, a maximum engine revolution number R2 and a maximum vehicle speed V2 in the second mode are set smaller than a maximum engine revolution number R1 and a maximum vehicle speed V1 in the first mode.

At this time, in the case of performing conveyance work by the front loader 70, for example, while the work unit 78 holds a conveyance object (e.g., soil, snow, or grass rolls), the mode shift switch 303 is operated to switch to the second mode so that the tractor 1 is moved at low speed. Thus, falling of the conveyance object, for example, can be prevented. On the other hand, in a case where no conveyance object is present for the work unit 78, the mode shift switch 303 is operated to switch to the first mode so that the tractor 1 is moved at high speed. Thus, the traveling time from a conveyance destination to a conveyance origin can be shortened, and thus, work can be performed efficiently.

By providing the loader lever 51 with the mode shift switch 303, the operator can easily switch a traveling speed of the tractor 1 with a hand operating the loader lever 51 (right hand in this embodiment) based on whether a conveyance object during conveyance work by the front loader 70 is present or not. Thus, while falling of a conveyance object is prevented during conveyance of the conveyance object by the front loader 70, the traveling time can be reduced in traveling after conveyance of the conveyance object is finished. Thus, work can be performed efficiently. In a case where the engine blipping control or auto-cruise control (traveling control of traveling with a specified vehicle speed maintained) with the switch 65 is performed, the mode shift operation with the mode shift switch 303 inhibits execution of such control.

In a case where accelerator cooperation control is performed with the accelerator cooperation switch 66a in the mode shift operation, a vehicle speed in a case where only the main gear shift pedal 41 is at the maximum position is set as the maximum vehicle speed set for each mode. On the other hand, in a case where no accelerator cooperation control is performed, a vehicle speed in a case where each of the main gear shift pedal 41 and the accelerator lever 48 is at the maximum position is set as the maximum vehicle speed set for each mode.

When an operation on the accelerator cooperation switch 66a is received, the number of revolutions of the engine 5 is changed in accordance with the pressing amount of the main gear shift pedal 41 so that it is thereby determined whether to perform accelerator cooperation control of increasing and reducing the vehicle speed of the tractor 1 or not. While the accelerator cooperation control is performed, the number of engine revolutions set by the accelerator lever 48 is equal to the number of engine revolutions in a case where the main gear shift pedal 41 is not pressed (i.e., the opening degree of the main gear shift pedal 41 is zero) (minimum engine revolution number). On the other hand, while the accelerator cooperation control is not performed, the engine 5 is driven at the number of engine revolutions set by the accelerator lever 48.

Figure 18:
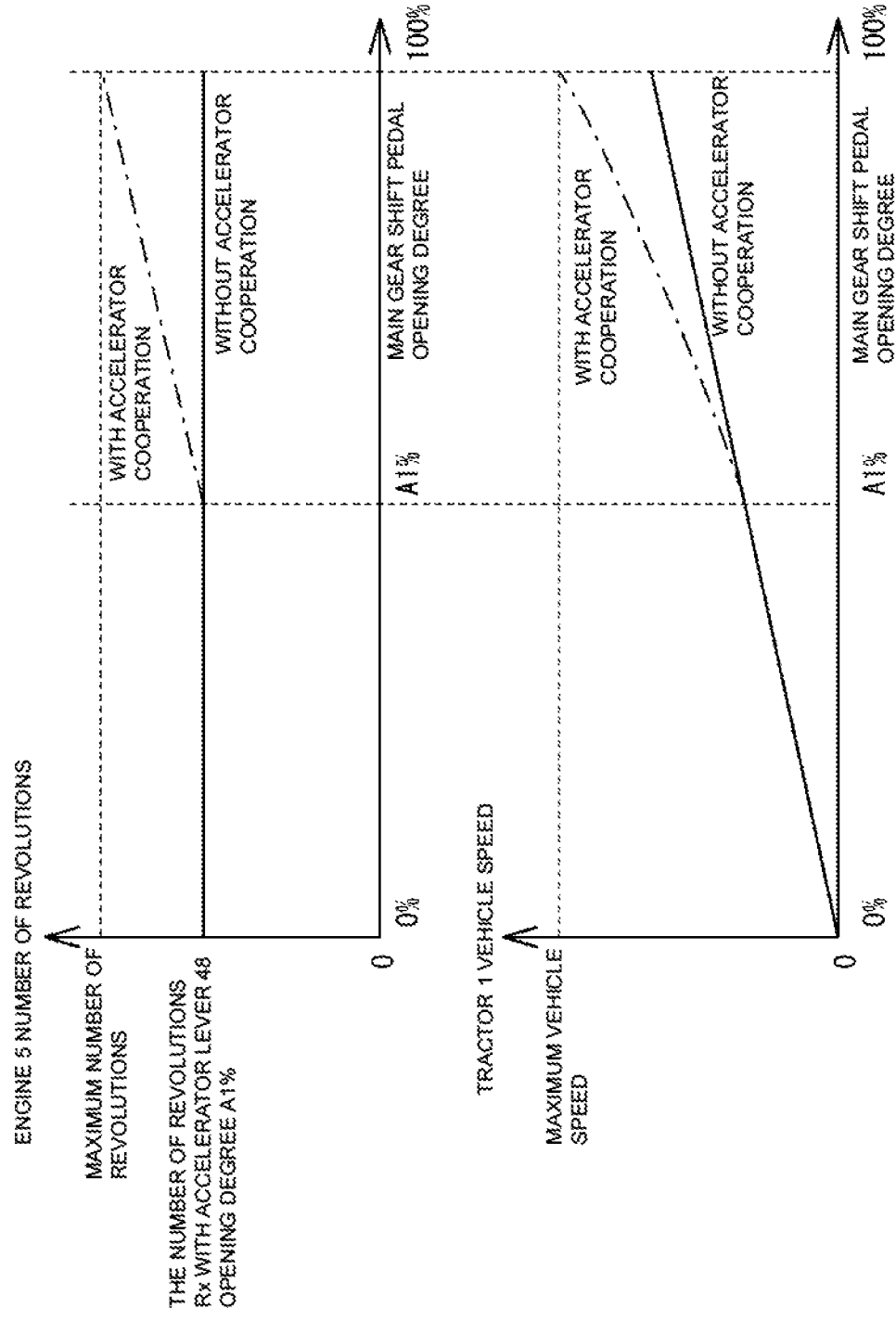

That is, as illustrated in FIG. 18, in a case where the accelerator cooperation switch 66a is turned on and accelerator cooperation control is performed, the vehicle speed of the tractor 1 changes in accordance with the pressing amount of the main gear shift pedal 41, and the number of revolutions of the engine 5 changes from the minimum number of engine revolutions set by the accelerator lever 48. Accordingly, in a case where the amount of work needs to be changed in accordance with the amount of traveling, such as spreading of compost or spreading of agricultural chemicals, accelerator cooperation control is performed so that the vehicle speed of the tractor 1 and the number of revolutions of the engine 5 are changed, and thereby, variations in work can be reduced. At this time, the pilot lamp 913c of the meter panel 906 is illuminated. On the other hand, in a case where the accelerator cooperation switch 66a is off and accelerator cooperation control is not performed, the number of revolutions of the engine 5 is kept constant at the minimum number of engine revolutions set by the accelerator lever 48, and the transmission ratio of the hydraulic stepless transmission 500 is changed in accordance with the pressing amount of the main gear shift pedal 41 so that the vehicle speed of the tractor 1 is changed.

When an operation on the anti-stall switch 66b is received, it is specified whether to perform anti-stall control of reducing the vehicle speed of the tractor 1 in a case where a load factor of the engine 5 increases. The load factor of the engine 5 refers to a ratio of an actual injection amount with respect to a maximum fuel injection amount set for each number of engine revolutions. In performing anti-stall control, when the load factor of the engine 5 exceeds a predetermined load, the transmission ratio of the hydraulic stepless transmission 500 is changed in order avoid a stall of the engine 5 (engine stall) so that the vehicle speed of the tractor 1 is reduced.

The vehicle speed sensitivity adjusting dial 55 is used for setting an acceleration/deceleration rate in the vehicle speed of the tractor 1, and by rotating the vehicle speed sensitivity adjusting dial 55, the acceleration/deceleration rate can be set from one through Nmax times (one through four times in this embodiment). That is, in the case of changing the moving speed such as loader work, the magnification is set high with the vehicle speed sensitivity adjusting dial 55, and responsiveness of the transmission ratio of the hydraulic stepless transmission 500 and the fuel injection amount of the engine 5 with respect to displacement of the pressing amount of the main gear shift pedal 41 is increased so that the rate of change in the vehicle speed of the tractor 1 is increased. On the other hand, in a case where the moving speed does not change, such as mower work, cultivation work, and compost spreading work, magnification is set low with the vehicle speed sensitivity adjusting dial 55 so that the rate of change in the vehicle speed of the tractor 1 with respect to displacement of the pressing amount of the main gear shift pedal 41 is reduced.

Figure 19:
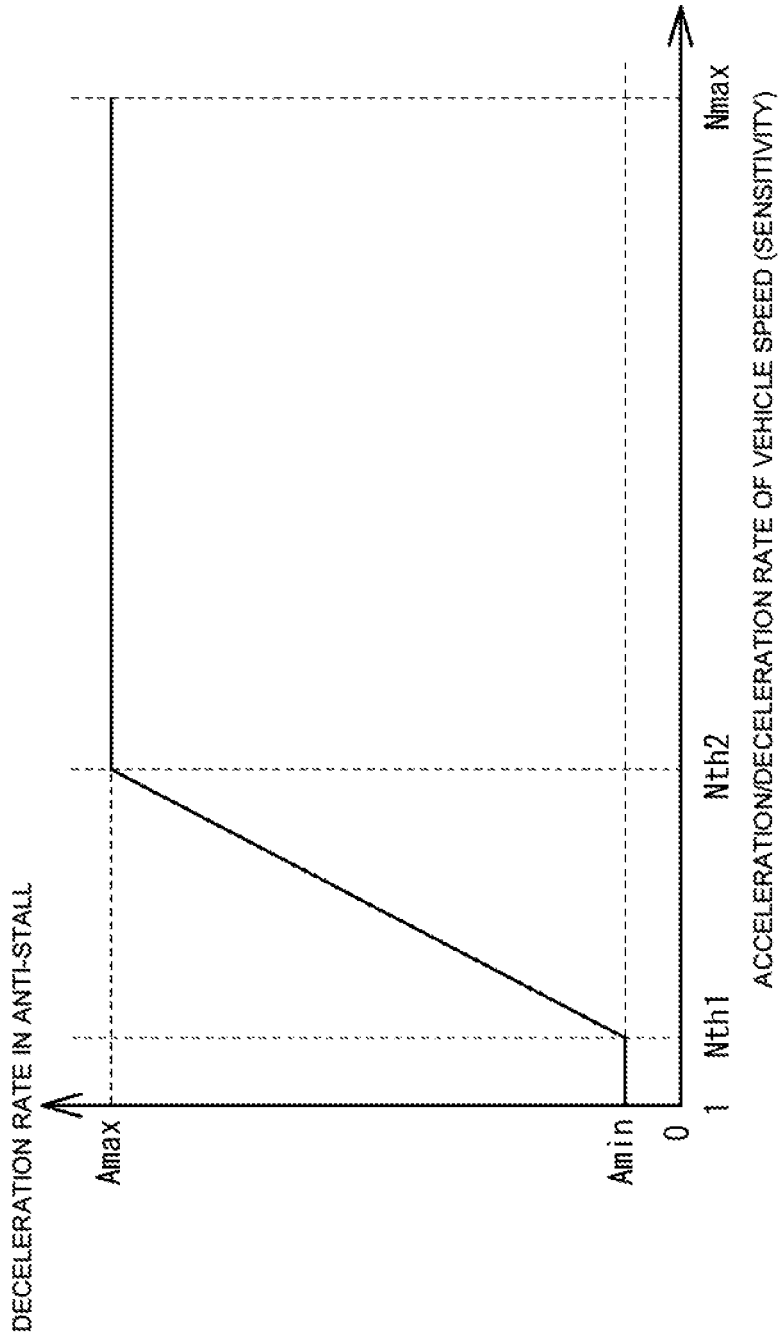

In accordance with setting of the acceleration/deceleration rate with the vehicle speed sensitivity adjusting dial 55, the deceleration rate (acceleration rate in returning) of the vehicle speed in performing anti-stall control is set. That is, as shown in FIG. 19, in the case of setting the acceleration/deceleration rate at one through Nth1 times (e.g., one through 1.2 times), the acceleration/deceleration rate is set at a minimum acceleration/deceleration rate Amin (e.g., 0.8 km/h/s) and is set for work under no sudden load, such as mower work. As the acceleration/deceleration rate is changed from Nth1 times (e.g., 1.2 times) to Nth2 times (e.g., twice), the acceleration/deceleration rate is increased from Amin to Amax (e.g., 5 km/h/s). In addition, in a case where the acceleration/deceleration rate is set from Nth2 times through Nmax times (e.g., from twice through four times), the acceleration/deceleration rate is set at a maximum acceleration/deceleration rate Amax (e.g., 5 km/h/s), and is set for work under sudden load, such as loader work.

Figure 20:
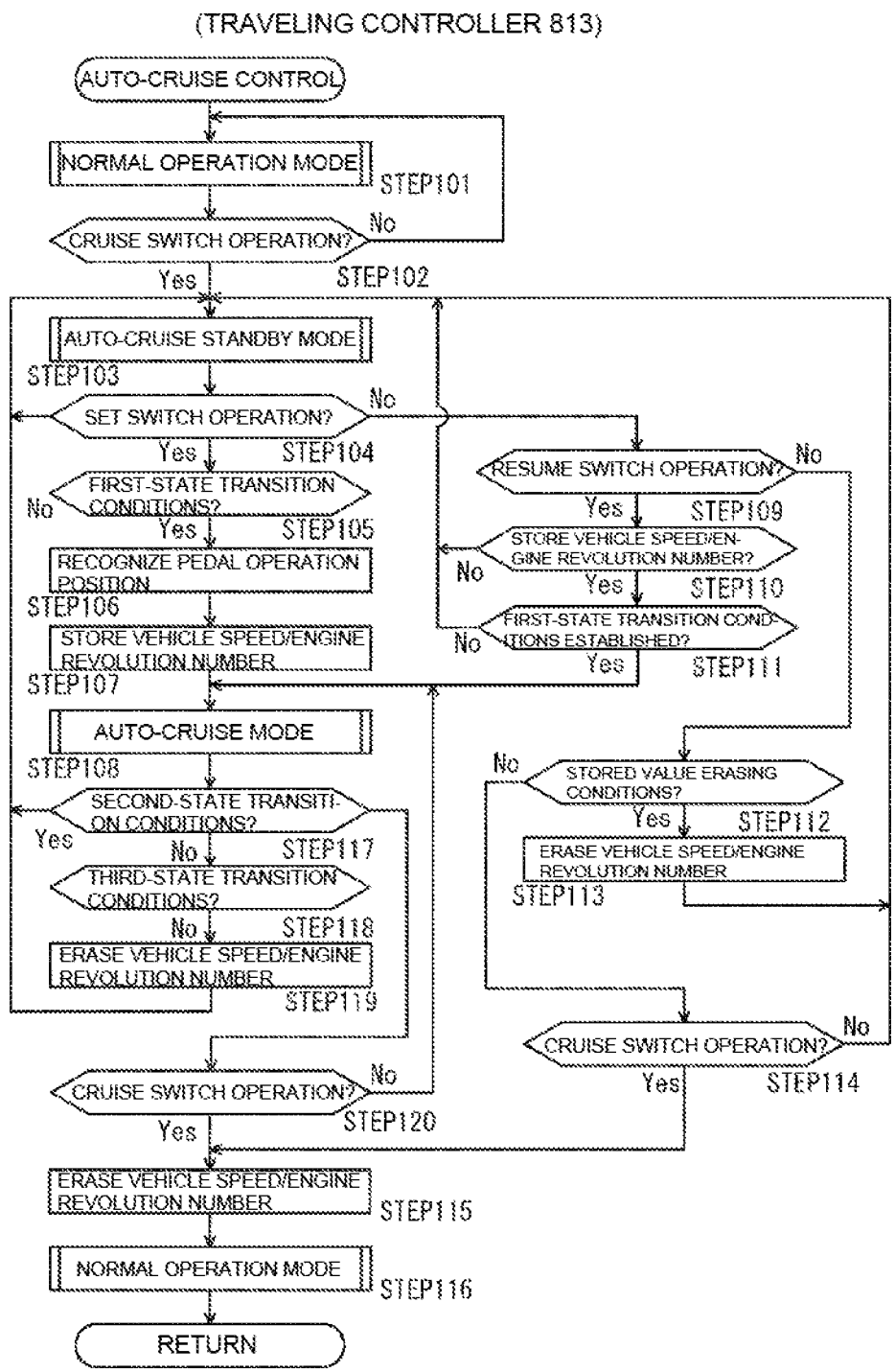

Next, auto-cruise control will now be described with reference to FIGS. 20 through 23. As depicted in FIG. 20, in an operation in a normal operation mode after start of the engine 5 (STEP101), if the traveling controller 813 determines reception of an operation on the auto-cruise switch 65a (Yes in STEP102), the traveling controller 813 shifts to an auto-cruise standby mode (STEP103). In the auto-cruise standby mode, when the traveling controller 813 determines reception of an operation on the set switch 65b (Yes in STEP104), if first-state transition conditions are satisfied (Yes in STEP105), the traveling controller 813 recognizes an operation position of the main gear shift pedal 41 by the pedal sensor 41a (STEP106).

The traveling controller 813 sets the vehicle speed of the tractor 1 and the number of revolutions of the engine 5 to be kept constant, based on the recognized operation position of the main gear shift pedal 41 and the maximum speed and the maximum number of engine revolutions in a traveling mode specified with the mode shift switch 303, and stores the set vehicle speed and number of engine revolutions (STEP107). Once the traveling controller 813 has stored the set vehicle speed and the set number of engine revolutions, the traveling controller 813 shifts to an auto-cruise mode (STEP108).

In the auto-cruise standby mode, when the traveling controller 813 determines reception of an operation on the resume switch 65c (Yes in STEP109), if the traveling controller 813 stores the previously set vehicle speed and number of engine revolutions (Yes in STEP110) and the first-state transition conditions are satisfied (Yes in STEP111), the traveling controller 813 shifts to an auto-cruise mode (STEP108). That is, when the resume switch 65c is operated, the traveling controller 813 shifts to an auto-cruise mode in a state where the vehicle speed and the number of engine revolutions set by the previous operation on the set switch 65b are kept stored.

The first-state transition conditions in STEP105 and STEP111 include a first condition that the tractor 1 is traveling forward or in reverse, a second condition that the tractor 1 is not in switching of traveling modes, a third condition in which the tractor 1 is not in engine blipping control, and a fourth condition that the tractor 1 is not in deceleration operation under anti-stall control, and when all the first through fourth conditions are satisfied, the tractor 1 shifts to the auto-cruise mode. At this time, the traveling controller 813 checks the lever position of the forward/reverse switching lever 36 based on a signal from the forward/reverse traveling sensor 825 to determine the first condition, determine the second condition based on whether a signal from the engine blipping switch 301 is present or not, determine the third condition based on an input timing of a signal from the mode shift switch 303, and determine the fourth condition based on a change in a load factor (or reduction of the vehicle speed) while anti-stall control is being performed.

If stored value erasing conditions are satisfied in the auto-cruise standby mode (Yes in STEP112), the traveling controller 813 erases the stored vehicle speed and number of engine revolutions (STEP113), and proceeds to STEP103. If the traveling controller 813 determines reception of an operation on the auto-cruise switch 65a in the auto-cruise standby mode (Yes in STEP114), the traveling controller 813 erases the stored vehicle speed and number of engine revolutions (STEP115), and proceeds to a normal operation mode in which the auto-cruise control is canceled (auto-cruise off mode) (STE116).

The stored value erasing conditions in STEP112 include a first condition that a gear ratio (sub-gear shift) in the sub-gear shift gear mechanism 502 is switched, a second condition that the traveling mode is switched, a third condition that a set value of a maximum vehicle speed is changed, a fourth condition that a set value of the maximum number of engine revolutions is changed, and a fifth condition that on/off of the accelerator cooperation control is switched, and when any one of the first through fifth conditions is satisfied, the stored vehicle speed and number of engine revolutions are erased (STEP113). At this time, the traveling controller 813 checks the lever position of the sub-gear shift lever 44 based on a signal from the sub-gear shift sensor 826 to determine the first condition, determine the second condition based on whether a signal from the mode shift switch 303 is present or not, determine the third and fourth conditions based on a signal from the revolution number/vehicle speed setting dial 53, and determine the fifth condition based on whether a signal from the accelerator cooperation switch 66a is present or not.

If second-state transition conditions are satisfied in the auto-cruise mode (Yes in STEP117), the traveling controller 813 shifts to the auto-cruise standby mode in a state where the vehicle speed and the number of engine revolutions set in shifting to the auto-cruise mode are stored (STEP103). If third-state transition conditions are satisfied in the auto-cruise mode (Yes in STEP118), the traveling controller 813 erases the stored vehicle speed and number of engine revolutions (STEP119), and then shifts to the auto-cruise standby mode (STEP103). In addition, if the traveling controller 813 determines reception of an operation on the auto-cruise switch 65a in the auto-cruise mode (Yes in STEP120), the traveling controller 813 erases the stored vehicle speed and number of engine revolutions (STEP115), and shifts to the normal operation mode in which the auto-cruise control is canceled (auto-cruise off mode) (STEP116).

The second-state transition conditions in STEP117 include a first condition that the forward/reverse switching lever 36 is neutral or at a reverse position, a second condition that the brake pedal 35 is operated, and a third condition that the clutch pedal 37 is operated, and if any one of the first through third conditions is satisfied, the traveling controller 813 shifts to the auto-cruise standby mode. At this time, the traveling controller 813 checks the lever position of the forward/reverse switching lever 36 based on a signal from the forward/reverse traveling sensor 825 to determine the first condition, determine the second condition based on whether a signal from the brake switch 851 is present or not, and determine the third condition based on whether a signal from the clutch switch 852 is present or not. The third-state transition conditions in STEP118 include a condition that the gear ratio (sub-gear shift) in the sub-gear shift gear mechanism 502 is switched, and the traveling controller 813 checks the lever position of the sub-gear shift lever 44 based on a signal from the sub-gear shift sensor 826 to determine the third-state transition condition.

When the traveling controller 813 shifts to the auto-cruise mode, the traveling controller 813 determines reception of operations on the set switch 65b serving as a deceleration switch, the resume switch 65c serving as an acceleration switch, and the main gear shift pedal 41, and increases and reduces the vehicle speed (transmission ratio of the hydraulic stepless transmission 500) of the tractor 1 or the number of revolutions of the engine 5. That is, each of the set switch 65b and the resume switch 65c functions as an acceleration/deceleration switch in the auto-cruise mode.

Figure 21:
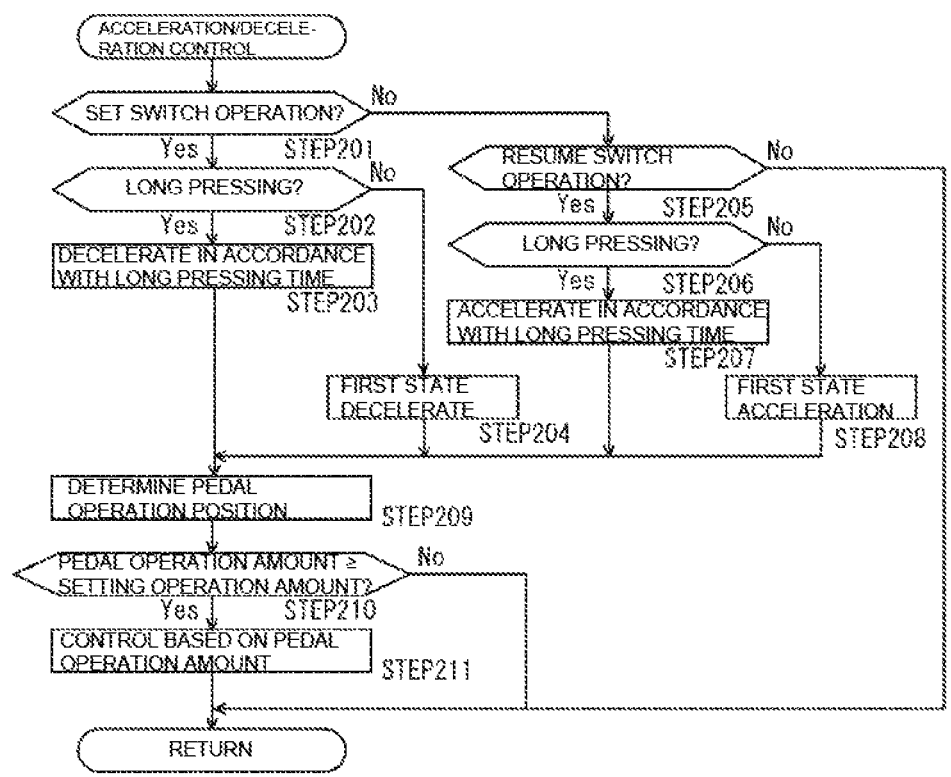

As depicted in FIG. 21, if the traveling controller 813 determines reception of an operation on the set switch 65b (Yes in STEP201), the traveling controller 813 determines whether the operation is a long pressing operation in which the time of pressing the set switch 65b is a predetermined time or longer (STEP202). If a long pressing operation is performed on the set switch 65b (Yes in STEP202), the vehicle speed (transmission ratio of the hydraulic stepless transmission 500) of the tractor 1 or the number of revolutions of the engine 5 is continuously reduced in accordance with the pressing time (STEP203). If the operation on the set switch 65b is not a long pressing operation (No in STEP202), the vehicle speed (transmission ratio of the hydraulic stepless transmission 500) of the tractor 1 or the number of revolutions of the engine 5 is reduced by one stage (STEP204).

Similarly, if the traveling controller 813 determines reception of an operation on the resume switch 65c (Yes in STEP205) and a long pressing operation is performed on the resume switch 65c (Yes in STEP206), the vehicle speed of the tractor 1 (transmission ratio of the hydraulic stepless transmission 500) or the number of revolutions of the engine 5 is continuously increased in accordance with the pressing time (STEP207). If an operation on the resume switch 65c is not a long pressing operation (No in STEP206), the vehicle speed of the tractor 1 (transmission ratio of the hydraulic stepless transmission 500) or the number of revolutions of the engine 5 is increased by one stage (STEP208).

In addition, the traveling controller 813 determines an operation position of the main gear shift pedal 41 based on a signal from the pedal sensor 41a (STEP209), and compares the vehicle speed or the number of engine revolutions (pedal operation amount) in accordance with the operation position of the main gear shift pedal 41 with the vehicle speed or the number of engine revolutions (setting operation amount) that has been set (STEP210). If the vehicle speed or the number of engine revolutions in accordance with the operation position of the main gear shift pedal 41 is larger than the vehicle speed or the number of engine revolutions set in the auto-cruise mode (setting operation amount) (Yes in STEP210), the traveling controller 813 controls to set the transmission ratio of the hydraulic stepless transmission 500 or the number of revolutions of the engine 5 based on the vehicle speed or the number of engine revolutions in accordance with the operation position of the main gear shift pedal 41 (STEP211). That is, in a case where the vehicle speed or the number of engine revolutions set in the auto-cruise mode is increased by an operation on the main gear shift pedal 41, the vehicle speed of the tractor 1 or the number of revolutions of the engine 5 is temporarily set in accordance with the amount of operation on the main gear shift pedal 41.

Figure 22:
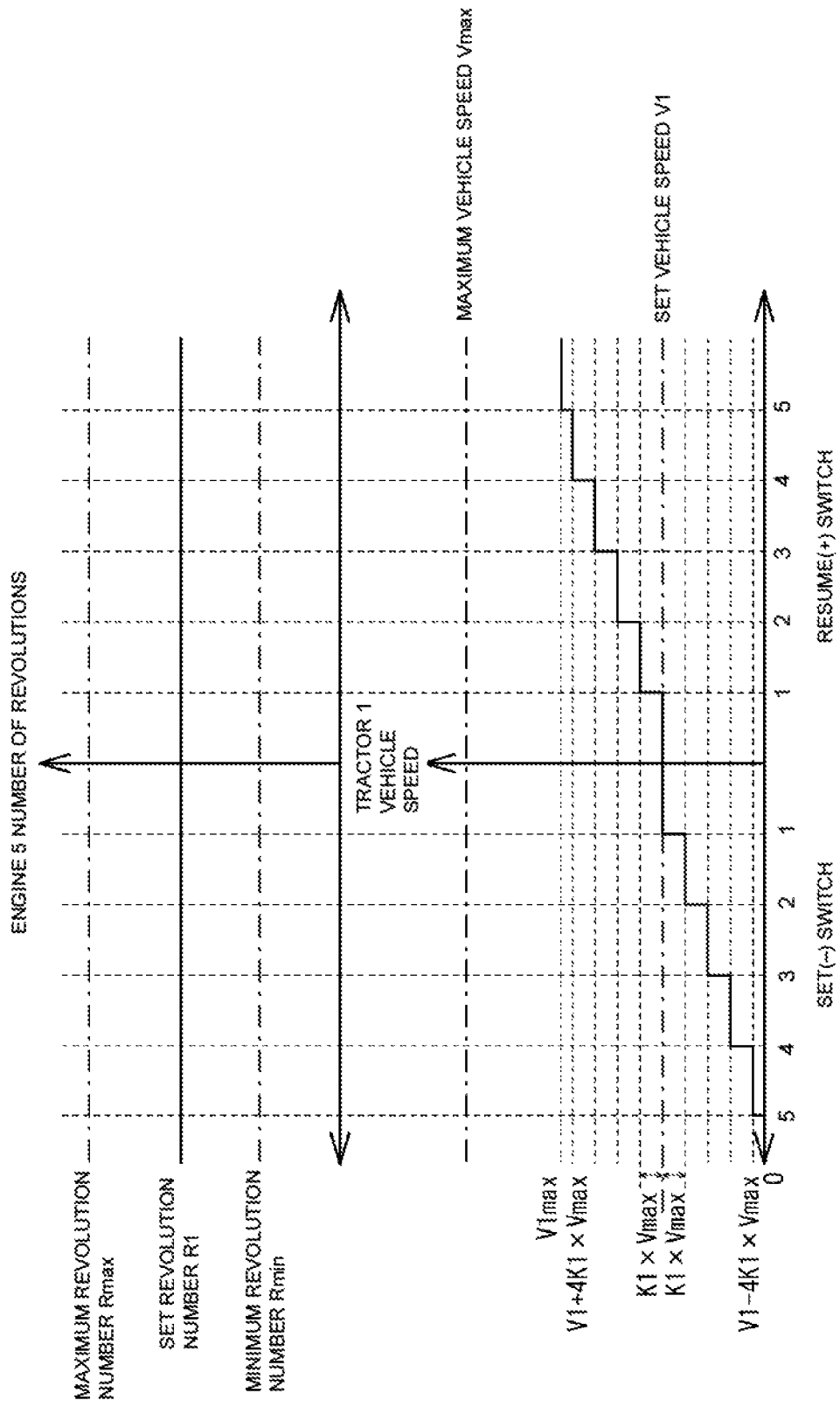

In a case where the traveling controller 813 shifts to the auto-cruise mode while accelerator cooperation control is not performed, the traveling controller 813 determines the amount of change of the vehicle speed in acceleration/deceleration with the set switch 65b and the resume switch 65c based on a maximum vehicle speed when the operation amount of pressing of the main gear shift pedal 41 is at the maximum. As illustrated in FIG. 22, in a case where the maximum vehicle speed is set at Vmax, the amount of vehicle speed change by one stage with the set switch 65b and the resume switch 65c is set at K1×Vmax (K1<1).

The traveling controller 813 calculates an acceleration/deceleration amount in accordance with the operation amount (the number of operations and an operating time) on the set switch 65b or the resume switch 65c, based on the set vehicle speed change amount K1×Vmax. Then, the traveling controller 813 sets the vehicle speed of the tractor 1 at a vehicle speed obtained by increasing and reducing the calculated acceleration/deceleration amount from the actual vehicle speed V1 in shifting to the auto-cruise mode. At this time, in a case where the maximum vehicle speed varies among traveling modes specified with the mode shift switch 303, the vehicle speed change amount is set based on the maximum vehicle speed set with respect to a traveling mode in shifting to the auto-cruise mode.

Figure 23:
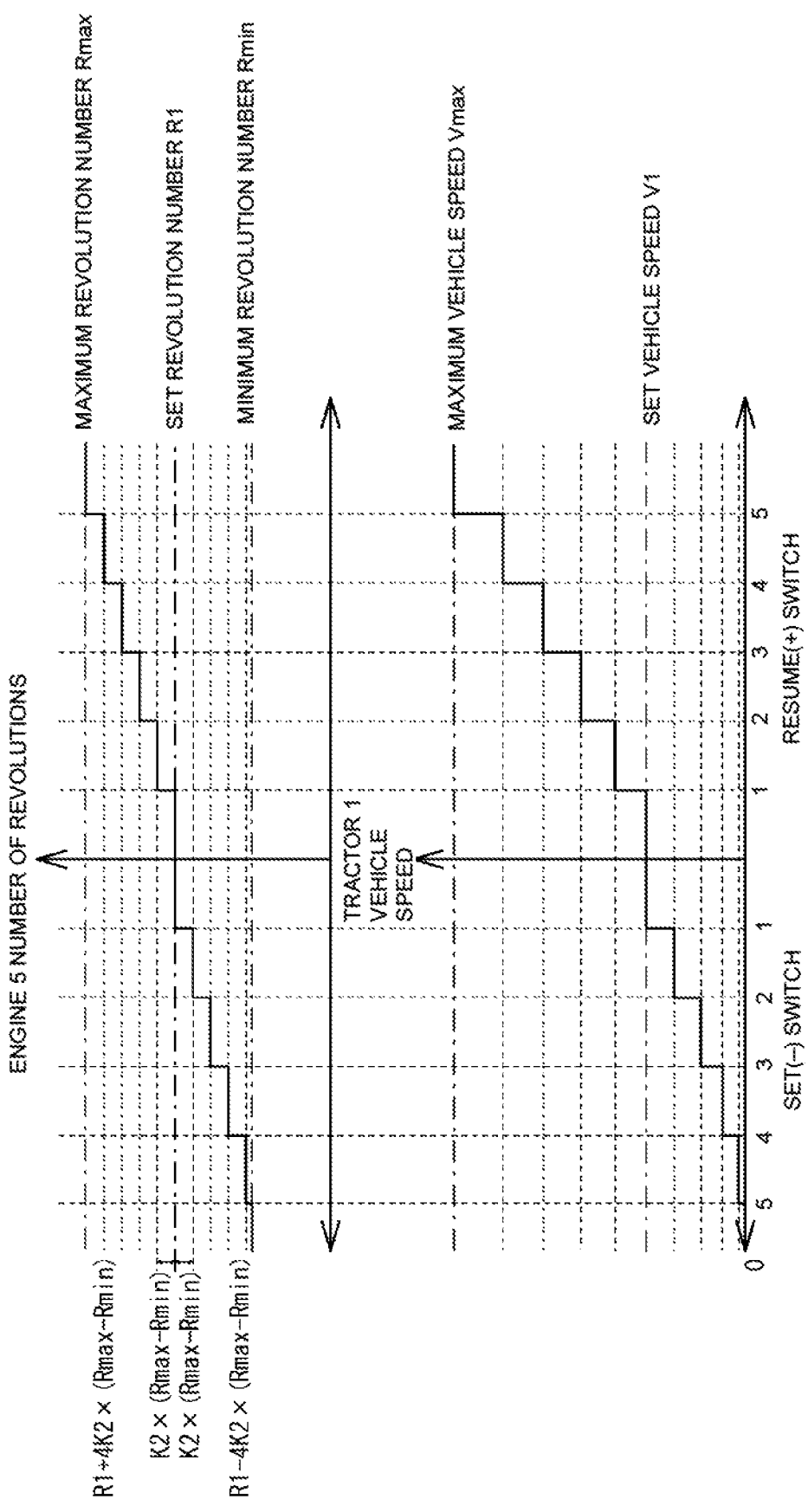

In a case where the traveling controller 813 shifts to the auto-cruise mode while accelerator cooperation control is not performed, the traveling controller 813 determines the amount of change of the number of engine revolutions in acceleration/deceleration with the set switch 65b and the resume switch 65c based on a maximum number of engine revolutions when the operation amount of pressing of the main gear shift pedal 41 is at the maximum. That is, as illustrated in FIG. 23, in the case where the maximum engine revolution number is set at Rmax, the amount of change of the number of engine revolutions in one stage with the set switch 65b and the resume switch 65c is set at K2×(Rmax−Rmin) (where K2<1, Rmin: minimum engine revolution number).

The traveling controller 813 calculates an acceleration/deceleration amount in accordance with the amount of operation (the number of operations and an operating time) on the set switch 65b or the resume switch 65c, based on the set amount of change in the number of engine revolutions K2×(Rmax−Rmin). Then, the traveling controller 813 sets the number of revolutions of the engine 5 at the number of engine revolutions obtained by increasing and reducing the calculated acceleration/deceleration amount from the actual number of engine revolutions R1 in shifting to the auto-cruise mode. At this time, in a case where the maximum engine revolutions varies among traveling modes specified with the mode shift switch 303, the amount of change in the number of engine revolutions is set based on the maximum number of engine revolutions set with respect to a traveling mode in shifting to the auto-cruise mode.

In the auto-cruise mode, the traveling controller 813 may set the amount of change in the vehicle speed in one stage with the set switch 65b and the resume switch 65c based on the actual vehicle speed V1 in shifting to the auto-cruise mode. At this time, in a case where the actual vehicle speed V1 is low, for example, the vehicle speed change amount decreases, whereas in a case where the actual vehicle speed V1 is high, the vehicle speed change amount is increased. In the auto-cruise mode, the traveling controller 813 may set the amount of change in the number of engine revolutions with the set switch 65b and the resume switch 65c based on the actual engine revolution number R1 in shifting to the auto-cruise mode. At this time, in a case where the actual engine revolution number R1 is low, the amount of change in the number of engine revolutions is reduced, while in a case where the actual engine revolution number R1 is high, the amount of change in the number of engine revolutions is increased.

The work vehicle (tractor) 1 according to this embodiment is configured to shift the speed of a driving force from the engine 5 mounted on the traveling body 2 in the transmission unit 17 and transfer the shifted force to the traveling units 3 and 4 and the work unit 70. The work vehicle (tractor) 1 includes the mode shift switch 303 for switching the maximum vehicle speed by the traveling units 3 and 4 or the maximum number of revolutions of the engine 5 set for each of a plurality of traveling modes, and the work unit operation lever (loader lever) 51 for operating the work unit 70. The work unit operation lever 51 is provided with the mode shift switch 303. Thus, the work unit operation lever 51 can be used for switching the maximum vehicle speed by the traveling units 3 and 4 and the maximum number of revolutions of the engine 5 in accordance with an operating state of the work unit 70, and thus, the work unit 70 and the traveling units 3 and 4 can be operated at the same time with one operation tool. As a result, operability can be enhanced. In addition, the maximum vehicle speed by the traveling units 3 and 4 or the maximum number of revolutions of the engine 5 is switched in accordance with a load on the work unit 70 so that not only errors in work can be reduced but also the traveling time in a non-work state can be reduced, and fuel efficiency in the non-work state can be enhanced.

In such a work vehicle 1, in the cockpit unit (cabin) 7 on the traveling body 2, the work unit operation lever 51 is disposed ahead of and outside the cockpit seat 8, the grip 320 of the work unit operation lever 51 is disposed near the cockpit seat 8, and the grip 320 is provided with the mode shift switch 303. The mode shift switch 303 is disposed on the side surface of the grip 320 facing the cockpit seat 8.

Since the grip 320 of the work unit operation lever 51 is provided with the mode shift switch 303, the operator can easily operate the mode shift switch 303 at a position at which the operator can easily hold the grip, and thus, operability can be further enhanced. In addition, since the mode shift switch 303 is disposed on the side surface of the grip 320 facing the cockpit seat 8, the operator can easily operate the mode shift switch 303 with the thumb of a hand holding the grip 320. Accordingly, complexity in operation can be reduced.

In the work vehicle 1 described above, the work unit operation lever 51 is provided with the engine blipping switch 301 that performs engine blipping control of increasing the number of revolutions of the engine 5 while keeping the vehicle speed by the traveling units 3 and 4 constant. In addition, while the engine blipping control is being performed, an operation to the mode shift switch 303 is invalid.

Since the work unit operation lever 51 is provided with the engine blipping switch 301 for performing the engine blipping control, the operator can change the number of revolutions of the engine 5 in accordance with a load on the work unit 70 and can keep the vehicle speed by the traveling units 3 and 4 constant. Thus, a change in the vehicle speed of the traveling units 3 and 4 can be suppressed based on a load on the work unit 70. Accordingly, a decrease in working efficiency in using the work unit 70 can also be suppressed. In addition, since an operation of the mode shift switch 303 is made invalid in performing the engine blipping control, it is possible to prevent the maximum vehicle speed and the maximum engine revolution number after switching from reaching abnormal values, and thus, occurrence of a sudden accident or the like can be avoided.

The work vehicle 1 described above includes the gear shift pedal (main gear shift pedal) 41 for adjusting the vehicle speed by the traveling units 3 and 4 and the number of revolutions of the engine 5 and the forward/reverse switching lever 36 for specifying forward or reverse traveling by the traveling units 3 and 4. The transmission unit 17 includes the hydraulic stepless transmission 500 for shifting the speed of a driving force from the engine 5 and the forward/reverse switching mechanism 501 for switching the shifted driving force from the hydraulic stepless transmission 500 from forward to reverse or from reverse to forward. The transmission ratio by the hydraulic stepless transmission 500 may be changed by the gear shift pedal 41 with switching by the forward/reverse switching mechanism 501 being performed by the forward/reverse switching lever 36.

The work vehicle (tractor) 1 according to this embodiment includes: the engine 5 mounted on the traveling body 2 including the traveling wheels 3 and 4; the hydraulic stepless transmission 500 that shifts the speed of a driving force from the engine 5; the gear shift pedal (main gear shift pedal) 41 that accelerates and decelerates a gear shift output of the hydraulic stepless transmission 500; and the control section (traveling controller) 813 that controls the engine 5 and the hydraulic stepless transmission 500 based on the operation amount on the gear shift pedal 41, and can perform an auto-cruise mode in which the vehicle speed is kept substantially constant. The vehicle speed and the number of engine revolutions are stored based on a foot operation position of the gear shift pedal 41 and the mode can be shifted to the auto-cruise mode. Thus, the vehicle speed kept constant in the auto-cruise mode can be set at an optimum vehicle speed in accordance with a work state. In addition, the mode can be shifted to the auto-cruise mode during an operation of the gear shift pedal 41, and thus, an operator can easily determine an optimum vehicle speed while checking road conditions. Thus, in shifting to the auto-cruise mode, a complicated operation is not necessary in setting the vehicle speed, and operability can be enhanced.

The work vehicle (tractor) 1 includes the auto-cruise switch 65a for setting whether to shift the auto-cruise mode and the set switch 65b for shifting the auto-cruise mode. When an operation on the auto-cruise switch 65a is received in the normal operation mode, the control section 813 shifts to the auto-cruise standby mode in which a shift to the auto-cruise mode is permitted. When an operation on the set switch 65b is received with the gear shift pedal 41 being pressed by foot in the auto-cruise standby mode, the control section 813 stores the vehicle speed and the number of engine revolutions in accordance with the foot operation position of the gear shift pedal 41, and shifts to the auto-cruise mode.

The work vehicle (tractor) 1 includes the acceleration/deceleration switch (set switch 65b and the resume switch 65c) for increasing and decreasing the vehicle speed in performing the auto-cruise mode. When the control section 813 receives operations on the acceleration/deceleration switches 65b and 65c in the auto-cruise mode, the control section 813 increases and reduces the vehicle speed stored in shifting to the auto-cruise mode so that the vehicle speed after acceleration/deceleration is kept substantially constant. The vehicle speed and the number of engine revolutions are increased and reduced stepwise in accordance with the number of operations on the acceleration/deceleration switches 65b and 65c. When the continuous operation time to the acceleration/deceleration switches 65b and 65c reaches a predetermined time or more, the vehicle speed is continuously increased or reduced. The acceleration/deceleration switches 65b and 65c are configured to adjust the vehicle speed in the auto-cruise mode to enable easy change of the vehicle speed during traveling in the auto-cruise mode. Accordingly, it is unnecessary to set the vehicle speed again in the auto-cruise mode during work or traveling, and thus, the vehicle speed can be changed to a speed suitable for work or traveling with an easy operation.

The work vehicle (tractor) 1 includes the accelerator cooperation switch 66a that performs accelerator cooperation control of changing the vehicle speed and the number of engine revolutions in accordance with the pressing amount of the gear shift pedal 41. In the case of a shift to the auto-cruise mode during accelerator cooperation control, when operations on the acceleration/deceleration switches 65b and 65c are received, the control section 813 increases and reduces the vehicle speed and the number of engine revolutions stored in the shift to the auto-cruise mode. When the control section 813 receives an operation on the accelerator cooperation switch 66a in the auto-cruise mode, the control section 813 erases the stored vehicle speed and the stored number of engine revolutions, and shifts to the auto-cruise standby mode.

The work vehicle (tractor) 1 includes an engine stall preventing switch (anti-stall switch) 66b for executing engine stall preventing control (anti-stall control) of preventing a stall of the engine by reducing the vehicle speed in accordance with a load. In the case of performing the engine stall preventing control in the auto-cruise mode, when the load increases, the vehicle speed is reduced, and then the load decreases, the control section 813 keeps the original vehicle speed. On the other hand, in a case where the vehicle speed is reduced based on the engine stall preventing control in the auto-cruise standby mode, the control section 813 invalidates an operation on the set switch 65b.

The work vehicle (tractor) 1 includes the acceleration/deceleration switches (the set switch 65b and the resume switch 65c) of increasing and reducing the vehicle speed in performing the auto-cruise mode and the mode shift switch 303 for switching among a plurality of traveling modes. The control section 813 stores maximum vehicle speeds individually set for a plurality of traveling modes, and in a case where the acceleration/deceleration switches 65b and 65c are operated in the auto-cruise mode, the control section 813 increases and reduces the vehicle speed stored in shifting to the auto-cruise mode based on the amount of change in accordance with the maximum vehicle speed in a traveling mode specified with the mode shift switch 303. The control section 813 sets an upper limit of the vehicle speed in the case where the vehicle speed is increased with the acceleration/deceleration switches 65b and 65c in the auto-cruise mode as the maximum vehicle speed in the traveling mode specified with the mode shift switch 303.

The work vehicle (tractor) 1 includes the accelerator cooperation switch 66a that performs accelerator cooperation control of changing the vehicle speed and the number of engine revolutions in accordance with the pressing amount of the gear shift pedal 41. In the case of a shift to the auto-cruise mode during the accelerator cooperation control, when the control section 813 receives operations on the acceleration/deceleration switches 65b and 65c, the control section 813 increases and reduces the vehicle speed and the number of engine revolutions stored in shifting to the auto-cruise mode. When the control section 813 receives an operation on the accelerator cooperation switch 66a in the auto-cruise mode, the control section 813 cancels the auto-cruise mode.

The control section 813 stores a maximum engine revolution number set for each of a plurality of traveling modes, and in a case where the acceleration/deceleration switches 65b and 65c are operated in the auto-cruise mode during accelerator cooperation control, the control section 813 increases and reduces the number of engine revolutions stored in shifting to the auto-cruise mode based on the amount of change in accordance with the maximum engine revolution number in the traveling mode specified with the mode shift switch 303. When the control section 813 receives an operation on the mode shift switch 303 in the auto-cruise mode, the control section 813 cancels the auto-cruise mode.

The configurations of components in the present invention are not limited to those of the illustrated embodiment, and can be variously changed without departing from the gist of the invention.

REFERENCE SIGNS LIST 2 traveling body
7 cabin
8 cockpit seat
35 brake pedal
36 forward/reverse switching lever
37 clutch pedal
41 main gear shift pedal
41a pedal sensor
44 sub-gear shift lever
48 accelerator lever
48a accelerator lever sensor
51 loader lever
53 revolution number/vehicle speed setting dial
54 revolution number/vehicle speed selecting switch
55 vehicle speed sensitivity adjusting dial
57 push-pull wire
58 push-pull wire
59 push-pull wire
61 key switch
62 operation lever
63 operation lever
64 regeneration switch 65a auto-cruise switch
65b set switch (deceleration switch)
65c resume switch (acceleration switch)
66a accelerator cooperation switch
66b anti-stall switch
70 front loader
271 engine controller (engine ECU)
301 engine blipping switch
302 valve operation switch
303 mode shift switch
317 support plate
318 lever fixing bracket
319 lever fixing bracket
320 grip
321 lock metal fitting
322 lateral tilt link
323 through hole
324 guide pipe
325 shaft body
326 longitudinal tilt link
327 boss
328 shaft body
329 U-shaped metal fitting
330 U-shaped metal fitting
331 restriction hole
624 main gear shift proportional solenoid valve
632 forward-traveling clutch solenoid valve
634 reverse-traveling clutch solenoid valve
813 traveling controller
823 output shaft rotation sensor (actual vehicle speed sensor)
825 forward/reverse traveling sensor
826 sub-gear shift sensor
828 brake position sensor
851 brake switch
852 clutch switch
853 parking brake switch
904 meter controller (meter ECU)
906 meter panel

The invention claimed is:

1. A work vehicle comprising:
an engine mounted on a traveling body including a traveling wheel;
a hydraulic stepless transmission mechanism configured to shift a speed of a driving force from the engine;
a gear shift pedal configured to perform an acceleration/deceleration operation of a shifted output from the hydraulic stepless transmission mechanism;
a control section configured to control the engine and the hydraulic stepless transmission mechanism based on an operation amount of the gear shift pedal, the work vehicle being capable of performing an auto-cruise mode of keeping a vehicle speed constant;
a cruise switch for setting whether to shift to the auto-cruise mode or not;
a set switch for shifting to the auto-cruise mode;
an acceleration/deceleration switch configured to increase and reduce a vehicle speed in performing the auto-cruise mode; and
an accelerator cooperation switch configured to perform an accelerator cooperation control of changing the vehicle speed in accordance with a pressing amount of the gear shift pedal and changing the number of revolutions of the engine; and
wherein the control section is further configured to:
shift to an auto-cruise standby mode in which a shift to the auto-cruise mode is permitted, when an on-operation on the cruise switch is received in a normal operation mode;
store a vehicle speed and number of revolutions of the engine in accordance with a foot operation position of the gear shift pedal and shift to the auto-cruise mode, when an operation on the set switch is received in a state where the gear shift pedal is pressed by the foot operation in the auto-cruise standby mode;
increase and reduce the vehicle speed stored in shifting to the auto-cruise mode and then keep the vehicle speed constant, when an operation on the acceleration/deceleration switch is received in the auto-cruise mode; and
increase and reduce the vehicle speed and the number of revolutions of the engine stored in shifting to the auto-cruise mode, when, in a case of shifting to the auto-cruise mode in performing the accelerator cooperation control, an operation on the acceleration/deceleration switch is received.

2. The work vehicle according to claim 1, wherein, when a continuous operation time to the acceleration/deceleration switch reaches a predetermined time or more, the vehicle speed is continuously increased and reduced.

3. The work vehicle according to claim 1, wherein, when the control section receives an operation on the accelerator cooperation switch in the auto-cruise mode, the control section is configured to erase the stored vehicle speed and the stored number of revolutions of the engine, and shifts to the auto-cruise standby mode.

4. The work vehicle according to claim 1, further comprising:
an engine stall preventing switch for performing an engine stall preventing control of reducing the vehicle speed in accordance with a load to prevent a stall of the engine;
wherein:
in a case where the engine stall preventing control is performed in the auto-cruise mode, when a load increases so that the vehicle speed is reduced and then the load decreases, the control section is configured to keep the vehicle speed at an original speed; and
in a case where the vehicle speed is reduced based on the engine stall preventing control in the auto-cruise standby mode, the control section is configured to invalidate the operation on the set switch.

5. A system for controlling a work vehicle, the system comprising:
a controller configured to be coupled to a work vehicle having a hydraulic stepless transmission, the controller configured to:
selectively set an operation mode to one of:
a normal operation mode;
an auto-cruise mode in which a vehicle speed of the work vehicle is maintained; and
an auto-cruise standby mode in which a switch to the auto-cruise mode is permitted;
wherein, during operation of the work vehicle, the controller is further configured to:
during the normal operation mode, switch to the auto-cruise standby mode based on detection of a cruise switch being in an on state; and during the auto-cruise standby mode, based on detection of a set switch being in an on state and in response to detection of operation of a gear shift pedal:
store the speed of the work vehicle and a number of revolutions of an engine of the work vehicle based on a position of the gear shift pedal; and
switch to the auto-cruise mode.

6. The system of claim 5, wherein the controller is further configured to:
receive an operation status of the cruise switch;
receive an operation status of the set switch; and
receive an operation status of a resume switch.

7. The system of claim 6, wherein, during operation in the auto-cruise mode, the controller is further configured to:
increase or reduce the stored vehicle speed by a predetermined value to a second vehicle speed; and
maintain the second vehicle speed.

8. The system of claim 6, wherein during operation in the auto-cruise mode:
the set switch is configured to reduce the stored vehicle speed; and
the resume switch is configured to increase the stored vehicle speed.

9. The system of claim 6, wherein the controller is further configured to:
based on an operation status of an accelerator cooperation switch, perform an accelerator cooperation control to change the vehicle speed in accordance with an operation amount of the gear shift pedal and change the number of revolutions of the engine; and
during the auto-cruise mode, based on detection of the accelerator cooperation switch being in an on state:
increase or reduce the stored vehicle speed and the stored number of revolutions of the engine.

10. The system of claim 5, wherein the controller is further configured to, during the auto-cruise mode, based on detection of an accelerator cooperation switch being in an on state:
increase or reduce the stored vehicle speed and the stored number of revolutions of the engine.

11. The system of claim 6, wherein:
the controller is further configured to switch from the auto-cruise standby mode to the auto-cruise mode based on one or more first-state transition conditions being satisfied; and
the one or more first-state transition conditions comprise:
a first condition that the work vehicle is traveling forward or in reverse;
a second condition that the work vehicle is not in switching of traveling modes;
a third condition that the work vehicle is not in an engine blipping control; and
a fourth condition that the work vehicle is not in a deceleration operation under anti-stall control.

12. A work vehicle comprising:
an engine mounted on a traveling body including a traveling wheel;
a hydraulic stepless transmission configured to shift a speed of a driving force from the engine;
a gear shift pedal configured to perform an acceleration/deceleration operation of a shifted output from the hydraulic stepless transmission;
a controller configured to control the engine and the hydraulic stepless transmission based on an operation amount of the gear shift pedal, the controller configured to selectively set an operation mode of the work vehicle to one of:
a normal mode;
an auto-cruise standby mode in which a switch to an auto-cruise mode is permitted; and
the auto-cruise mode in which a vehicle speed is maintained;
a cruise switch for setting whether to switch to the auto-cruise mode;
an acceleration/deceleration switch or an engine stall prevention switch; and
a set switch for switching to the auto-cruise mode; and
wherein:
the controller is further configured to:
switch to the auto-cruise standby mode based on an on-operation on the cruise switch during the normal operation mode; and
based on an operation on the set switch in a state where the gear shift pedal is operated during the auto-cruise standby mode:
store a vehicle speed and number of revolutions of the engine in accordance with the operation amount of the gear shift pedal; and
switch to the auto-cruise mode.

13. The work vehicle according to claim 12, wherein:
the work vehicle comprises the acceleration/deceleration switch configured to adjust a vehicle speed during the auto-cruise mode; and
based on receipt at the controller of an indication of an operation on the acceleration/deceleration switch during the auto-cruise mode, the controller is configured to adjust the stored vehicle speed.

14. The work vehicle according to claim 13, wherein, based on a continuous operation time corresponding to the acceleration/deceleration switch being greater than or equal to a predetermined time, the controller is configured to adjust the vehicle speed.

15. The work vehicle according to claim 13, further comprising:
an accelerator cooperation switch configured to perform an accelerator cooperation control of changing the vehicle speed in accordance with an operation amount of the gear shift pedal and a change in the number of revolutions of the engine.

16. The work vehicle according to claim 15, wherein:
in a case of switching to the auto-cruise mode in performing the accelerator cooperation control, based on receipt at the controller of the operation on the acceleration/deceleration switch, the controller is configured to adjust the vehicle speed and the number of revolutions of the engine stored in switching to the auto-cruise mode; and
based on receipt by the controller of an operation on the accelerator cooperation switch during the auto-cruise mode, the controller is configured to:
erase the stored vehicle speed and the stored number of revolutions of the engine; and
switch to the auto-cruise standby mode.

17. The work vehicle according to claim 12, wherein:
the work vehicle comprises the engine stall prevention switch configured to reduce the vehicle speed in accordance with a load; and
wherein:
in a case where engine stall prevention control is performed during the auto-cruise mode, based on a load increase such that the vehicle speed is reduced and then the load decreases, the controller is configured to maintain the vehicle speed at an original speed; and in a case where the vehicle speed is reduced based on the engine stall prevention control during the auto-cruise standby mode, the controller is configured to invalidate the operation on the set switch.

18. The work vehicle according to claim 12, wherein the controller is further configured to switch from the auto-cruise standby mode to the auto-cruise mode based on one or more first-state transition conditions being satisfied.

19. The work vehicle according to claim 18, wherein the one or more first-state transition conditions comprise:

a first condition that the work vehicle is traveling forward or in reverse;

a second condition that the work vehicle is not in switching of traveling modes;

a third condition that the work vehicle is not in an engine blipping control; and a fourth condition that the work vehicle is not in a deceleration operation under anti-stall control.

20. The work vehicle according to claim 12, further comprising:

an accelerator cooperation switch configured to perform an accelerator cooperation control of changing the vehicle speed in accordance with an operation amount of the gear shift pedal and a change in the number of revolutions of the engine; and wherein, in a case of switching to the auto-cruise mode in performing the accelerator cooperation control, based on receipt at the controller of the operation on the acceleration/deceleration switch, the controller is configured to adjust the vehicle speed and the number of revolutions of the engine stored in switching to the auto-cruise mode.

* * * * *